US012211459B2

(12) United States Patent
Zhang

(10) Patent No.: US 12,211,459 B2
(45) Date of Patent: Jan. 28, 2025

(54) APPARATUS AND DRIVING METHOD, BACKLIGHT DRIVING UNIT, MICROCHIP, AND DATA TRANSMISSION METHOD

(71) Applicants: BOE MLED Technology Co., Ltd., Beijing (CN); BOE TECHNOLOGY GROUP CO., LTD., Beijing (CN)

(72) Inventor: Zhitao Zhang, Beijing (CN)

(73) Assignees: BOE MLED TECHNOLOGY CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 18/292,410

(22) PCT Filed: Jun. 9, 2022

(86) PCT No.: PCT/CN2022/097956

§ 371 (c)(1),
(2) Date: Jan. 26, 2024

(87) PCT Pub. No.: WO2023/236156

PCT Pub. Date: Dec. 14, 2023

(65) Prior Publication Data

US 2024/0249691 A1 Jul. 25, 2024

(51) Int. Cl.
*G09G 3/34* (2006.01)
*G09G 3/36* (2006.01)
*H05B 45/22* (2020.01)

(52) U.S. Cl.
CPC ......... *G09G 3/3426* (2013.01); *G09G 3/3648* (2013.01); *G09G 2320/0233* (2013.01); *G09G 2370/10* (2013.01)

(58) Field of Classification Search
None
See application file for complete search history.

(56) References Cited

U.S. PATENT DOCUMENTS

2009/0033612 A1* 2/2009 Roberts .................. H05B 45/22 345/102
2009/0066621 A1 3/2009 Iwamoto et al.
(Continued)

FOREIGN PATENT DOCUMENTS

CN 1783197 A 6/2006
CN 101563724 A 4/2013
(Continued)

OTHER PUBLICATIONS

International search report of PCT application No. PCT/CN2022/097956 dated Nov. 28, 2022.
(Continued)

*Primary Examiner* — Lin Li
(74) *Attorney, Agent, or Firm* — Calfee, Halter & Griswold LLP

(57) ABSTRACT

A driving method for a liquid crystal display apparatus includes generating and sending, by a system unit according to image data, respective ones of dimming data groups sequentially; and responding, by a backlight driver, to respective ones of the dimming data groups sequentially; where responding, by the backlight driver, to any one of the dimming data groups comprises: receiving the dimming data group, and sending driving configuration information to each of the signal channels according to the dimming data group. The driving configuration information of any one of the signal channels includes driving data and address related information of a selected microchip in the signal channel, and the selected microchip is the microchip that controls the light emitting zone corresponding to the dimming data in the dimming data group. The method further includes acquiring, by the selected microchip, the driving data according to the driving configuration information.

20 Claims, 9 Drawing Sheets

(56) References Cited

U.S. PATENT DOCUMENTS

| | | | |
|---|---|---|---|
| 2016/0071485 A1 | 3/2016 | Tripathi et al. | |
| 2017/0053606 A1 | 2/2017 | Min et al. | |
| 2018/0182306 A1* | 6/2018 | Seong | G09G 3/36 |
| 2020/0135122 A1* | 4/2020 | Song | G09G 3/3413 |
| 2020/0365092 A1 | 11/2020 | Yoshida | |
| 2022/0114975 A1* | 4/2022 | Kim | G09G 3/3426 |

FOREIGN PATENT DOCUMENTS

| | | | |
|---|---|---|---|
| CN | 103339550 | A | 10/2013 |
| CN | 105598781 | A | 5/2016 |
| CN | 111326120 | A | 6/2020 |
| CN | 111613146 | A | 9/2020 |
| CN | 112954845 | A | 6/2021 |
| CN | 113516953 | A | 10/2021 |
| CN | 114299885 | A | 4/2022 |
| TW | 201947573 | A | 12/2019 |
| WO | 2018086933 | A1 | 5/2018 |
| WO | 2021259102 | A1 | 12/2021 |

OTHER PUBLICATIONS

Written opinion of of PCT application No. PCT/CN2022/097956 dated Nov. 28, 2022.

* cited by examiner

APPARATUS AND DRIVING METHOD, BACKLIGHT DRIVING UNIT, MICROCHIP, AND DATA TRANSMISSION METHOD

CROSS-REFERENCE TO RELATED APPLICATION

The present application is the U.S. National Stage of International Application No. PCT/CN2022/097956, filed on Jun. 9, 2022, the contents of which are incorporated herein by reference in their entireties for all purposes.

TECHNICAL FIELD

The present disclosure relates to the field of display technology, and in particular to a liquid crystal display apparatus and a driving method, a backlight driver, a microchip, and a data transmission method.

BACKGROUND

In a liquid crystal display apparatus, the response to image data of the backlight module and that of the liquid crystal display panel differ by at least one frame, which limits the number of partitions and the refresh rate of the backlight module.

It should be illustrated that the information disclosed in the above background section is intended only to enhance the understanding of the background of the present disclosure, and may therefore include information that does not constitute prior art known to those ordinary skilled in the art.

SUMMARY

The purpose of the present disclosure is to overcome the deficiencies of the related art described above, and provide a liquid crystal display apparatus and a driving method, a backlight driver, a microchip, and a data transmission method, so as to reduce a backlight delay time.

According to a first aspect of the present disclosure, a driving method for a liquid crystal display apparatus is provided. The liquid crystal display apparatus includes a backlight module, the backlight module includes a plurality of signal channels, and each of the signal channels includes a plurality of microchips and light emitting zones controlled by the microchips.

The driving method for the liquid crystal display apparatus includes:

generating and sending, by a system unit according to image data, respective ones of dimming data groups sequentially, where each of the dimming data groups includes dimming data corresponding to a light emitting zone controlled by one row of microchips or by multiple adjacent rows of the microchips;

responding, by a backlight driver, to respective ones of the dimming data groups sequentially; where responding, by the backlight driver, to any one of the dimming data groups includes: receiving the dimming data group, and sending driving configuration information to each of the signal channels according to the dimming data group; where the driving configuration information of any one of the signal channels includes driving data of a selected microchip and address related information of the selected microchip in the signal channel, and the selected microchip is the microchip that controls the light emitting zone corresponding to the dimming data in the dimming data group; and acquiring, by the selected microchip, the driving data according to the driving configuration information.

According to an embodiment of the present disclosure, the driving configuration information does not include driving data of another microchip other than the selected microchip.

According to an embodiment of the present disclosure, the driving configuration information includes a protocol tag and at least one configuration data group; and any piece of the driving configuration information includes starting address information and at least one piece of the driving data that are arranged sequentially; where the starting address information is address information corresponding to a first piece of the driving data, the address information corresponding to the first piece of the driving data is capable of being used for determining address information corresponding to other driving data, and the protocol tag is used for marking a communication protocol used by the driving configuration information.

According to an embodiment of the present disclosure, the driving configuration information further includes a starting tag and an ending tag; and the starting tag, the protocol tag, each configuration data group, and the ending tag are arranged sequentially.

According to an embodiment of the present disclosure, the driving configuration information includes first driving configuration information, the first driving configuration information includes a first protocol tag and the at least one configuration data group that are arranged sequentially, and the configuration data group of the first driving configuration information includes the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

According to an embodiment of the present disclosure, the driving configuration information includes second driving configuration information, and the second driving configuration information includes a second protocol tag, an address stride and the at least one configuration data group; where the address stride is a difference between address information corresponding to a subsequent piece of the driving data and address information corresponding to a previous piece of the driving data that are in a same configuration data group.

According to an embodiment of the present disclosure, the sending the driving configuration information to each of the signal channels according to the dimming data group includes:

determining, according to a position of the light emitting zone corresponding to each piece of the dimming data in the dimming data group as received, address information of the microchip that controls the light emitting zone in any one of the signal channels;

determining, according to the address information as determined, the communication protocol used for generating the driving configuration information of each of the signal channels; and generating and sending, according to the communication protocol as determined, the driving configuration information of each of the signal channels.

According to an embodiment of the present disclosure, the dimming data group includes the dimming data corresponding to the light emitting zone controlled by the one row of the microchips; and the sending the driving configuration information to each of the signal channels according to the dimming data group includes:

sending the first driving configuration information to each of the signal channels according to the dimming data group.

According to an embodiment of the present disclosure, the dimming data group includes the dimming data corresponding to the light emitting zone controlled by the plurality of rows of the microchips; and the sending the driving configuration information to each of the signal channels according to the dimming data group includes:

sending the second driving configuration information to each of the signal channels according to the dimming data group.

According to an embodiment of the present disclosure, the acquiring, by the selected microchip, the driving data according to the driving configuration information includes:

receiving, by a microchip, the driving configuration information;

determining, according to the protocol tag of the driving configuration information, a communication protocol selected for decoding the driving configuration information;

acquiring, according to the communication protocol as determined, address information corresponding to each piece of the driving data in the driving configuration information; and acquiring, by the microchip when the address information corresponding to the driving data matches address information of the microchip, the driving data, thereby the microchip serving as the selected microchip.

According to a second aspect of the present disclosure, a data transmission method is provided. The data transmission method is applied to a backlight driver to drive a backlight module. The backlight module includes a plurality of signal channels, and each of the signal channels includes a plurality of microchips and light emitting zones controlled by the microchips.

The data transmission method includes:

receiving a dimming data group, where the dimming data group includes dimming data corresponding to a light emitting zone controlled by one row of microchips or by multiple adjacent rows of the microchips;

determining driving configuration information of each of the signal channels according to the dimming data group; where the driving configuration information of any one of the signal channels includes driving data of a selected microchip and address related information of the selected microchip in the signal channel, and the selected microchip is the microchip that controls the light emitting zone corresponding to the dimming data in the dimming data group; and sending corresponding driving configuration information to each of the signal channels.

According to an embodiment of the present disclosure, the driving configuration information does not include driving data of another microchip other than the selected microchip.

According to an embodiment of the present disclosure, the driving configuration information includes at least one configuration data group; any configuration data group includes starting address information and at least one piece of the driving data that are arranged sequentially; where the starting address information is address information corresponding to a first piece of the driving data, and the address information corresponding to the first piece of the driving data is capable of being used for determining address information corresponding to other driving data.

According to an embodiment of the present disclosure, the driving configuration information further includes a starting tag, a protocol tag and an ending tag arranged sequentially; each configuration data group is located between the protocol tag and the ending tag; and the protocol tag is used for marking a communication protocol used by the driving configuration information.

According to an embodiment of the present disclosure, the driving configuration information includes first driving configuration information, the first driving configuration information includes a first protocol tag and the at least one configuration data group that are arranged sequentially, and the configuration data group of the first driving configuration information includes the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

According to an embodiment of the present disclosure, the driving configuration information includes second driving configuration information, and the second driving configuration information includes a second protocol tag, an address stride and the at least one configuration data group; where the address stride is a difference between address information corresponding to a subsequent piece of the driving data and address information corresponding to a previous piece of the driving data that are in a same configuration data group.

According to an embodiment of the present disclosure, the sending the driving configuration information to each of the signal channels according to the dimming data group includes:

determining, according to a position of the light emitting zone corresponding to each piece of the dimming data in the dimming data group as received, address information of the microchip that controls the light emitting zone in any one of the signal channels;

determining, according to the address information as determined, the communication protocol used for generating the driving configuration information of each of the signal channels; and generating and sending, according to the communication protocol as determined, the driving configuration information of each of the signal channels.

According to a third aspect of the present disclosure, a data transmission method is provided. The data transmission method is applied to a microchip to control a light emitting zone of a backlight module. The data transmission method includes:

receiving driving configuration information, where the driving configuration information includes driving data of each selected microchip, address related information of the selected microchip, and a protocol tag;

determining, according to the protocol tag of the driving configuration information, a communication protocol selected for decoding the driving configuration information;

acquiring, according to the communication protocol as determined, address information corresponding to each piece of the driving data in the driving configuration information; and acquiring the driving data when the address information of the driving data matches address information of the microchip.

According to an embodiment of the present disclosure, the driving configuration information does not include driving data of another microchip other than the selected microchip.

According to an embodiment of the present disclosure, the driving configuration information includes at least one configuration data group; and any configuration data group includes starting address information and at least one piece of the driving data that are arranged sequentially; where the starting address information is address information corresponding to a first piece of the driving data, and the address information corresponding to the first piece of the driving data is capable of being used for determining address information corresponding to other driving data.

According to an embodiment of the present disclosure, the driving configuration information includes first driving configuration information, the first driving configuration information includes a first protocol tag and the at least one configuration data group that are arranged sequentially, and the configuration data group of the first driving configuration information includes the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

According to an embodiment of the present disclosure, the driving configuration information includes second driving configuration information, and the second driving configuration information includes a second protocol tag, an address stride and the at least one configuration data group; where the address stride is a difference between address information corresponding to a subsequent piece of the driving data and address information corresponding to a previous piece of the driving data that are in a same configuration data group.

According to a fourth aspect of the present disclosure, a backlight driver is provided. The backlight driver is configured to drive a backlight module. The backlight module includes a plurality of signal channels, and each of the signal channels includes a plurality of microchips and light emitting zones controlled by the microchips. The backlight driver includes:

an independent transceiver, configured to receive a dimming data group, where the dimming data group includes dimming data corresponding to a light emitting zone controlled by one row of microchips or by multiple adjacent rows of the microchips;

a microprocessor, configured to determine driving configuration information of each of the signal channels according to the dimming data group; where the driving configuration information of any one of the signal channels includes driving data of a selected microchip and address related information of the selected microchip in the signal channel, and the selected microchip is the microchip that controls the light emitting zone corresponding to the dimming data in the dimming data group; and a programmable logic controller, configured to send corresponding driving configuration information to each of the signal channels.

According to an embodiment of the present disclosure, the driving configuration information does not include driving data of another microchip other than the selected microchip.

According to an embodiment of the present disclosure, the driving configuration information includes at least one configuration data group; any configuration data group includes starting address information and at least one piece of the driving data that are arranged sequentially; where the starting address information is address information corresponding to a first piece of the driving data, and the address information corresponding to the first piece of the driving data is capable of being used for determining address information corresponding to other driving data.

According to an embodiment of the present disclosure, the driving configuration information further includes a starting tag, a protocol tag and an ending tag arranged sequentially; where each configuration data group is located between the protocol tag and the ending tag, and the protocol tag is used for marking a communication protocol used by the driving configuration information.

According to an embodiment of the present disclosure, the driving configuration information includes first driving configuration information, the first driving configuration information includes a first protocol tag and the at least one configuration data group that are arranged sequentially, and the configuration data group of the first driving configuration information includes the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

According to an embodiment of the present disclosure, the driving configuration information includes second driving configuration information, and the second driving configuration information includes a second protocol tag, an address stride and the at least one configuration data group; where the address stride is a difference between address information corresponding to a subsequent piece of the driving data and address information corresponding to a previous piece of the driving data that are in a same configuration data group.

According to an embodiment of the present disclosure, the microprocessor is configured to: determine, according to a position of the light emitting zone corresponding to each piece of the dimming data in the dimming data group as received, address information of the microchip that controls the light emitting zone in any one of the signal channels; determine, according to the address information as determined, the communication protocol used for generating the driving configuration information of each of the signal channels; and generate and send, according to the communication protocol as determined, the driving configuration information of each of the signal channels.

According to a fifth aspect of the present disclosure, a microchip is provided. The microchip is configured to control a light emitting zone of a backlight module. The microchip includes:

a configuration information acquisition unit, configured to receive driving configuration information, where the driving configuration information includes driving data of each selected microchip, address related information of the selected microchip, and a protocol tag;

a protocol query unit, configured to determine, according to the protocol tag of the driving configuration information, a communication protocol selected for decoding the driving configuration information;

an address mapping unit, configured to acquire, according to the communication protocol as determined, address information corresponding to each piece of the driving data in the driving configuration information; and a data acquisition unit, configured to acquire the driving data when the address information of the driving data matches address information of the microchip.

According to an embodiment of the present disclosure, the driving configuration information does not include driving data of another microchip other than the selected microchip.

According to an embodiment of the present disclosure, the driving configuration information includes at least one configuration data group; and any configuration data group includes starting address information and at least one piece of the driving data that are arranged sequentially; where the starting address information is address information corresponding to a first piece of the driving data, and the address information corresponding to the first piece of the driving data is capable of being used for determining address information corresponding to other driving data.

According to an embodiment of the present disclosure, the driving configuration information includes first driving configuration information, the first driving configuration information includes a first protocol tag and the at least one configuration data group that are arranged sequentially, and the configuration data group of the first driving configuration information includes the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

According to an embodiment of the present disclosure, the driving configuration information includes second driving configuration information, and the second driving configuration information includes a second protocol tag, an address stride and the at least one configuration data group; where the address stride is a difference between address information corresponding to a subsequent piece of the driving data and address information corresponding to a previous piece of the driving data that are in a same configuration data group.

According to a sixth aspect of the present disclosure, a liquid crystal display apparatus is provided. The liquid crystal display apparatus includes a control module, a backlight module and a liquid crystal display panel. The control module includes a system unit and the aforementioned backlight driver. The backlight module includes the aforementioned microchip and the light emitting zone controlled by the microchip.

It should be understood that the foregoing general description and the following detailed description are exemplary and explanatory only, and cannot limit the present disclosure.

BRIEF DESCRIPTION OF THE DRAWINGS

The accompanying drawings, which are incorporated in and constitute a part of this specification, illustrate embodiments consistent with the present disclosure and are used in conjunction with the specification to explain the principles of the present disclosure. Obviously, the drawings in the following description are only some embodiments of the present disclosure. For those ordinary skilled in the art, other drawings can also be obtained from these drawings without paying creative effort.

DETAILED DESCRIPTION

Figure 1:
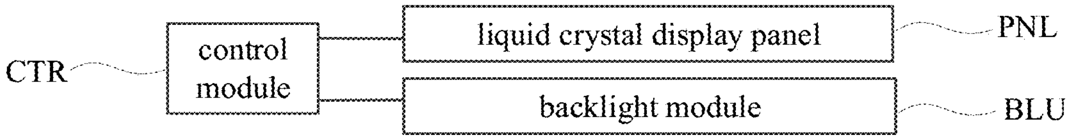
FIG. 1 is a schematic structural diagram of a liquid crystal display apparatus according to an embodiment of the present disclosure.

Example embodiments are now described more comprehensively with reference to the accompanying drawings. However, the example embodiments may be implemented in various forms and should not be construed as being limited to the embodiments set forth herein. Rather, providing these embodiments makes the present disclosure comprehensive and complete, and comprehensively conveys the concept of example embodiment to those skilled in the art. The same reference numerals in the drawings denote the same or similar structures, and thus their detailed descriptions will be omitted. In addition, the accompanying drawings are merely schematic illustrations of the present disclosure and are not necessarily drawn to scale.

The terms “a”, “an”, “the”, “said” and “at least one” are used to indicate the existence of one or more elements/components/etc.; and the terms “include” and “have” are used to denote an open-ended inclusion and mean that there may be additional elements/components/etc. in addition to the listed elements/components/etc. The terms “first”, “second” and “third” etc. are used merely as markers and not as quantitative limitations to the objects thereof.

The present disclosure provides a liquid crystal display apparatus. Referring to FIG. 1, the liquid crystal display apparatus includes a liquid crystal display panel PNL, a control module CTR and a backlight module BLU. The control module CTR simultaneously drives the liquid crystal display panel PNL and the backlight module BLU.

From the perspective of the stacked structure, the liquid crystal display panel may include an array substrate and a color film substrate that are stacked in sequence. The array substrate, the color film substrate, and a frame sealant that is disposed between the array substrate and the color film substrate define a closed box-shaped area. The area is filled with liquid crystals. The liquid crystal display panel further includes a first polarizer located at a side of the array substrate away from the color film substrate, and a second polarizer located at a side of the color film substrate away from the array substrate. The array substrate is provided with pixel electrodes and pixel driving circuits used for loading data voltages to the pixel electrodes. A common electrode is provided on the array substrate or the color film substrate. By controlling the strength of the electric field between the pixel electrode and the common electrode, the degree of twisting or lodging of the liquid crystal within the corresponding range of the pixel electrode may be adjusted, then the polarization direction of the polarized light passing through the liquid crystal is adjusted, and finally the light exit rate of the liquid crystal display panel within the corresponding range of the pixel electrode is adjusted.

Figure 2:
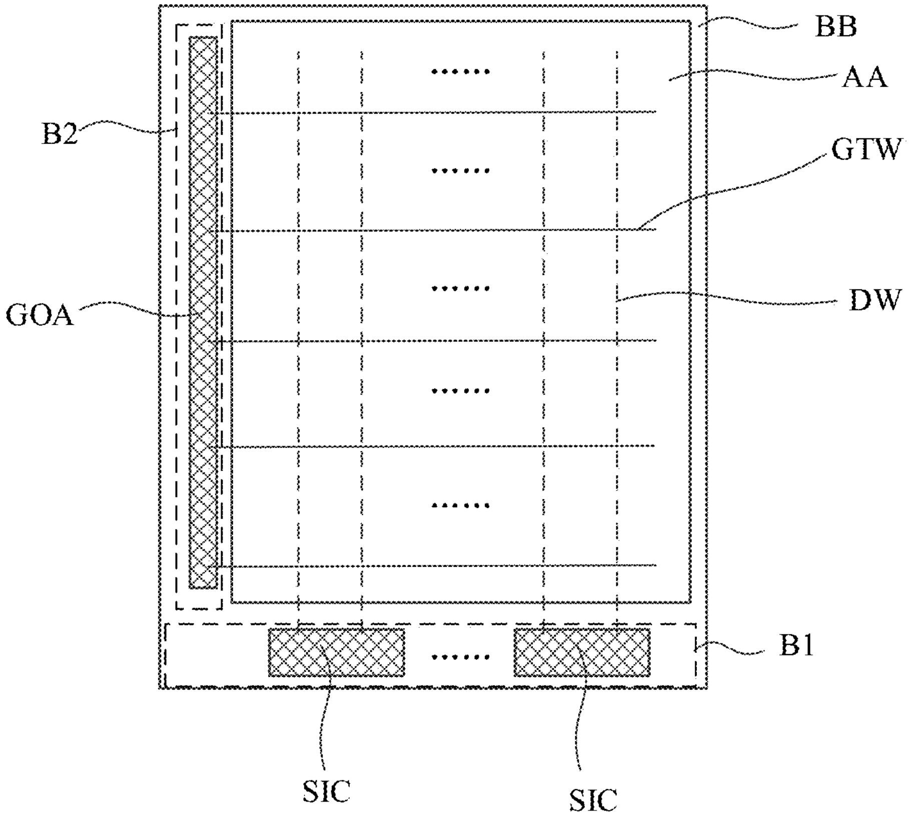
FIG. 2 is a schematic structural diagram of a liquid crystal display panel according to an embodiment of the present disclosure.

FIG. 2 shows a schematic structural diagram of a liquid crystal display panel PNL in an embodiment of the present disclosure. From a planar perspective, the liquid crystal display panel PNL may include a display area AA and a peripheral area BB surrounding the display area AA. In the display area AA, the array substrate is provided with gate wires GTW extending along a row direction, and data wires DW extending along a column direction. The gate wires GTW and data wires DW define a plurality of pixel areas, and the pixel electrodes and the pixel driving circuits may be located in the pixel areas. In an example, the pixel driving circuit may be a thin film transistor serving as a switching transistor, where one end of the switching transistor is electrically connected to the data wire DW, the other end of the switching transistor is connected to the pixel electrode, and the gate of the switching transistor is connected to the gate wire GTW. The peripheral area BB of the array substrate includes a first peripheral area B1 in which source driving circuits SIC are bound, and a second peripheral area B2 in which a gate driving circuit GOA is arranged. The first peripheral area B1 extends along the column direction, and the second peripheral area B2 extends along the row direction. The gate driving circuit GOA is electrically connected to each gate wire GTW, and is used for loading a scanning signal, to the gate wires GTW, that causes the switching transistor to be conducted. The source driving circuit SIC is electrically connected to the data wires DW, and is used for generating a data voltage according to image synchronization data and load the data voltage to the data wire DW.

Referring to FIG. 2, in this example, there are multiple source driving circuits SIC of the liquid crystal display panel PNL, and each source driving circuit SIC may drive a plurality of data wires DW respectively. Further, the source driving circuit SIC is a chip, and the array substrate is provided in the first peripheral area B1 with a flexible printed circuit (FPC) binding area and a binding area of the source driving circuit. The source driving circuit SIC may be bound in the binding area of the source driving circuit. The binding area of the source driving circuit is electrically connected to the data wire DW and the FPC binding area through wiring, respectively. The FPC binding area may be bound and connected to the control module CTR through the FPC. In this way, the signals and voltages of the control module CTR may be transmitted to the source driving circuit SIC through the FPC. Furthermore, the signal between the source driving circuit SIC and the control module CTR may be a low voltage differential signal (LVDS) or a mini LVDS signal to reduce signal crosstalk.

Of course, in other embodiments of the present disclosure, the liquid crystal display panel PNL may also be presented in other structures. For example, the array substrate may not be provided with the gate driving circuit GOA but may be additionally bound with a gate driving circuit board; or for example, the array substrate may be provided with gate driving circuits GOA on both sides of the array substrate in the row direction in order to reduce the voltage drop of the scanning signal or to increase the scanning frequency; for another example, the source driving circuits SIC are provided at both ends of the array substrate in the column direction so as to drive the liquid crystal display panel PNL on both sides, thereby reducing the voltage drop on the data wire DW in the large-size liquid crystal display panel PNL, especially the voltage drop on the data wire DW in a splicing screen. For another example, the source driving circuit SIC may not be provided on the liquid crystal display panel PNL, but may be provided on a chip on film (COF). The present disclosure does not limit the relative positional relationship between the source driving circuit SIC and the liquid crystal display panel PNL, nor does the present disclosure limit the arrangement form thereof, as long as the source driving circuit SIC is capable of directly driving each pixel in the display area of the liquid crystal display panel PNL.

Figure 3:
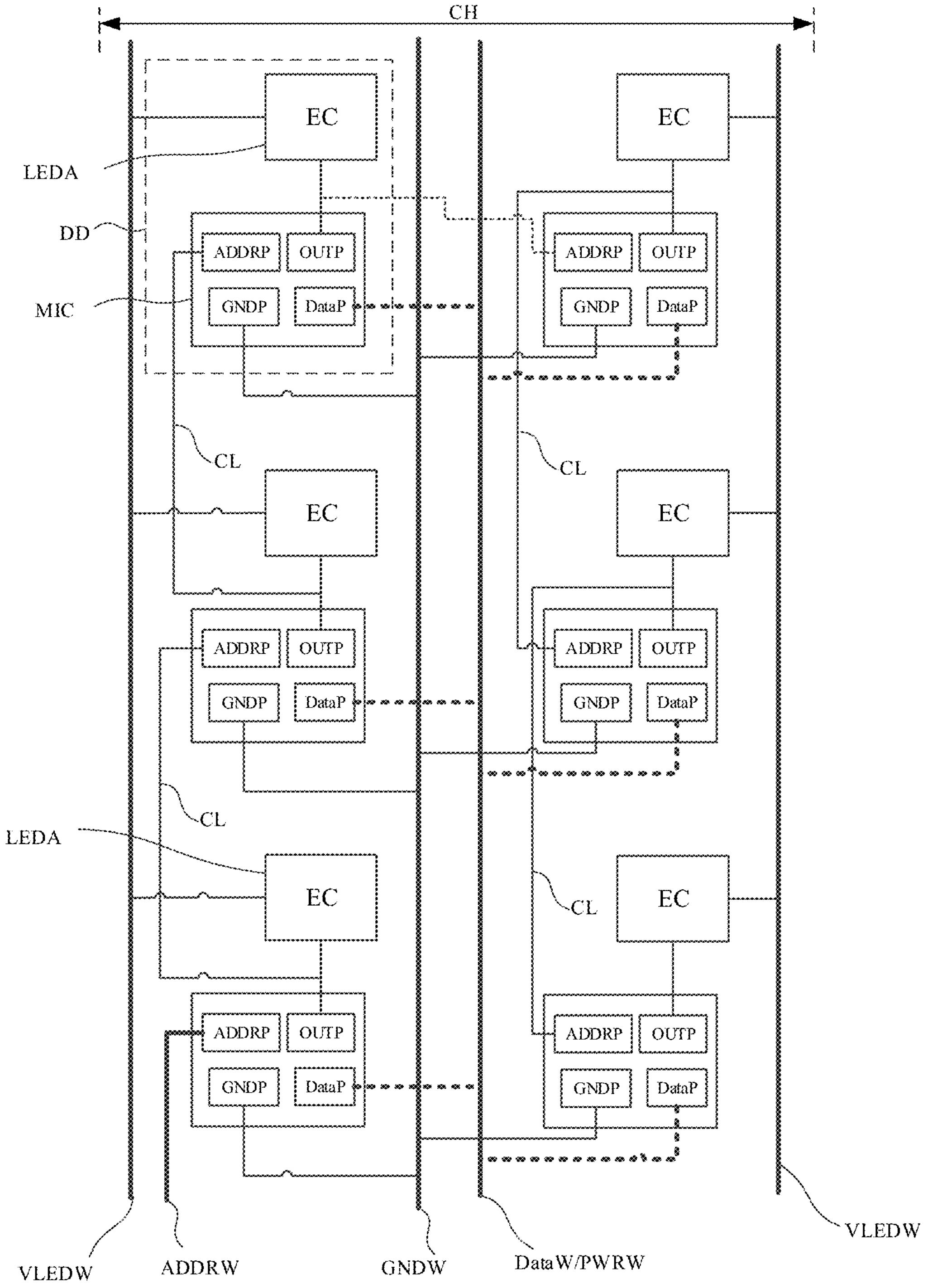
FIG. 3 is a schematic structural diagram of a lamp panel according to an embodiment of the present disclosure.
Figure 4:
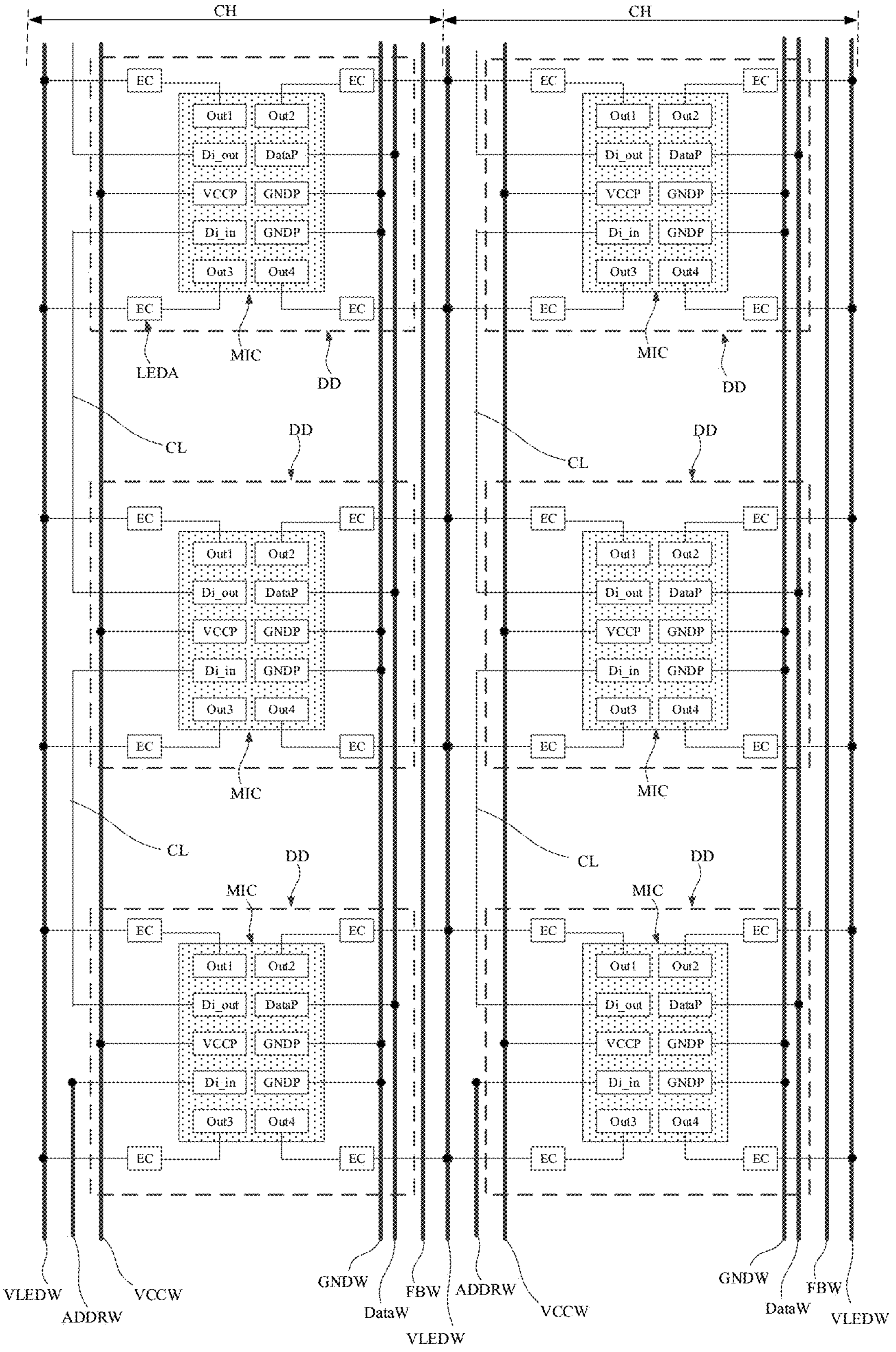
FIG. 4 is a schematic structural diagram of a lamp panel according to an embodiment of the present disclosure.

The backlight module BLU exemplified by an embodiment of the present disclosure includes a lamp panel. FIG. 3 and FIG. 4 illustrate two embodiments of architectures of the lamp panel. Referring to FIG. 3 and FIG. 4, the lamp panel may be provided with control units DD. Each control unit DD includes a microchip MIC and at least one light emitting zone LEDA controlled by the microchip MIC. Light emitting zones LEDA are distributed in an array to enable the backlight module BLU to present good luminous uniformity and facilitate the debugging of the backlight module BLU. Each light emitting zone LEDA includes one or more light-emitting elements (such as Mini LEDs or Micro LEDs). When there is a plurality of light-emitting elements in the same light emitting zone LEDA, these light-emitting elements may be connected in series, in parallel, or mixed in series and parallel, whichever allows each of the light-emitting elements to be driven, for example, whichever allows each of the light-emitting elements to be in an electrical path with a same current amplitude, and the plurality of light-emitting elements in the electrical path constitutes the light-emitting circuit EC. In the present disclosure, the microchip MIC realizes the control of the overall brightness of the light emitting zone LEDA by driving the brightness of each light-emitting element in the light emitting zone LEDA. Optionally, the microchip MIC controls, under the control of the control module CTR, the brightness of each light-emitting element in the light emitting zone LEDA, so as to control the brightness of the light emitting zone LEDA, so that the brightness of the backlight module BLU and the image of the liquid crystal display panel PNL are coordinated to improve the display effect, such as improving the contrast.

Referring to FIG. 3 and FIG. 4, a driving data wire DataW is provided on the lamp panel. The microchip MIC may be electrically connected to the driving data wire DataW in order to receive the required driving data Data from the driving data wire DataW, and to control each light emitting zone LEDA according to the driving data Data as received, for example, to control a conducting duration of an electrical path formed by each light emitting zone LEDA and the microchip MIC and/or an amplitude of a current signal in the electrical path formed by each light emitting zone LEDA and the microchip MIC. Optionally, the microchip MIC may pre-perform, before receiving the driving data Data, address configuration to obtain address information. The driving data Data on the driving data wire DataW may be associated with the address information. When the address information corresponding to the driving data Data matches the address information of the microchip MIC, the microchip MIC may receive the driving data Data as target driving data Data for use in controlling the light emitting zone LEDA controlled by the microchip MIC.

A plurality of microchip MICs with a cascade relationship and a plurality of light emitting zones LEDA controlled by the plurality of microchip MICs form a signal channel CH. One signal channel CH at least includes a driving power wire VLEDW, a ground power wire GNDW, a driving data wire DataW, and an address wire ADDRW. The first level microchip MIC of each signal channel CH is connected to the address wire ADDRW. The N-th level microchip MIC and the N+1-th level microchip MIC are connected to each other through a cascade line CL, where N is a positive integer. A plurality of microchips MIC in a same signal channel CH are connected to a same driving data wire DataW, and each microchip MIC receives the driving data Data through the same driving data wire DataW. Therefore, the address information of each microchip MIC in the same signal channel CH needs to be different. The address configuration information of two microchips MIC located in two different signal channels CH may be the same or different.

In the present disclosure, the driving data wire DataW in the signal channel CH may be presented in a straight line, a zigzag line, a reciprocating line, or in accordance with other forms, whichever allows the electrical signal to remain continuous. In the signal channel CH, the microchips MIC may be arranged in one or more columns, and these microchips MIC need to be connected to the driving data wire DataW in the signal channel CH. Viewed from an overall perspective, the signal channel CH may extend along the column direction, and respective ones of the signal channels CH may be arranged along the row direction. In the description of the row direction and the column direction of the backlight module BLU in the present disclosure, the row direction and the column direction are consistent with the row direction and the column direction of the liquid crystal display panel PNL, respectively.

As follows, the lamp panel of the backlight module BLU in the present disclosure is exemplarily introduced by using the examples in FIG. 3 and FIG. 4 respectively. It can be understood that the lamp panel of the backlight module BLU in the present disclosure may also be of other structures.

In the lamp panel exemplified in FIG. 3, one signal channel CH includes two columns of microchips MIC, and each microchip MIC controls one light emitting zone LEDA. Referring to FIG. 3, there may be two driving power wires VLEDW and the two driving power wires VLEDW are located at both sides of the signal channel CH along the row direction. Two adjacent driving power wires VLEDW of two adjacent signal channels CH may be merged with each other into one driving power wire VLEDW with a larger wire width. In this example, the driving data wire DataW and the power wire PWRW are combined into one wire, so that the signal transmitted by the wire may be a power line carrier signal, and the power line carrier signal may provide the microchip MIC with the driving data Data while supplying power to the microchip MIC. Correspondingly, the control module CTR includes a backlight driving circuit LEDD, and the backlight driving circuit LEDD generates and outputs the power line carrier signal.

Referring to the lamp panel exemplified in FIG. 3, a microchip MIC may include four pins such as an address pin ADDRP, a data pin DataP, a ground pin GNDP, and an output pin OUTP. The data pin DataP is electrically connected to the driving data wire DataW to obtain the power to drive the microchip MIC and obtain the required driving data Data from the driving data wire DataW. The ground pin GNDP is electrically connected to the ground power wire GNDW, the output pin OUTP is electrically connected to a first end of a light-emitting circuit in the light emitting zone LEDA, and a second end of the light-emitting circuit in the light emitting zone LEDA may be electrically connected to the driving power wire VLEDW. The address pin ADDRP may be electrically connected to the address wire ADDRW or the cascade line CL to receive address configuration information from the address wire ADDRW to configure the address information of the microchip MIC. In the same signal channel CH, respective ones of the microchips MIC may be cascaded in sequence, that is, the address information of the N-th level microchip MIC plus 1 becomes the address information of the N+1-th level microchip MIC. The output pin OUTP of a previous level microchip MIC and the address pin ADDRP of the next level microchip MIC may be electrically connected through the cascade line CL between them. In this way, the next level microchip MIC may determine its own address information according to the address information of the previous level microchip MIC. Exemplarily, the previous level microchip MIC may determine its own address information after receiving the address configuration information via the address pin ADDRP, and generate the address configuration information of the next level microchip MIC and forward the address configuration information to the next level microchip MIC via the output pin OUTP. Optionally, after powering on, each microchip MIC configures its own address information; after the address information of each microchip MIC is determined, the microchip MIC then receives the driving data Data from the driving data wire DataW according to the address information. After the microchip MIC receives the driving data Data, the conducting duration between the output pin OUTP and the ground power wire GNDW may be controlled according to the driving data Data. When it is conductive between the output pin OUTP and the ground power wire GNDW, the second end of the light-emitting circuit is electrically connected to the driving power wire VLEDW, and the first end of the light-emitting circuit is electrically connected to the ground power wire GNDW through the output pin OUTP, the microchip MIC and the ground pin GNDP, so that the light-emitting circuit is conducted and emits light. When it is cut off between the output pin OUTP and the ground power wire GNDW, the first end of the light-emitting circuit is disconnected from the ground power wire GNDW, so that the light-emitting circuit is not conducted and does not emit light. The microchip MIC controls, according to the driving data Data, the conducting duration between the output pin OUTP and the ground power wire GNDW, so as to control the conducting duration of the light-emitting circuit and the light emitting zone LEDA, thereby realizing the control of the brightness of each light emitting zone LEDA.

In another example, referring to FIG. 4, one control unit DD includes one microchip MIC and four light emitting zones LEDA controlled by the microchip MIC, and each light emitting zone LEDA is provided with a light-emitting circuit EC. The microchip MIC includes four output pins, namely an output pin Out1, an output pin Out2, an output pin Out3, and an output pin Out4, and the microchip MIC is provided with pins such as a data pin DataP, at least one ground pin GNDP, a chip power pin VCCP, an address output pin Di_out, and an address input pin Di_in. The lamp panel is provided with a wiring group that is set coordinately with each column of microchips MIC, and each wiring group includes two driving power wires VLEDW, an address wire ADDRW, a cascade line CL, a chip power wire VCCW, a ground power wire GNDW, a driving data wire DataW, etc. The second end of the light-emitting circuit EC in the light emitting zone LEDA is electrically connected to the driving power wire VLEDW. The first end of the light-emitting circuit EC in the light emitting zone LEDA is electrically connected to one of the output pins. The ground pin GNDP is electrically connected to the ground power wire GNDW, the data pin DataP is electrically connected to the driving data wire DataW, and the chip power pin VCCP is electrically connected to the chip power wire VCCW. Among the adjacent and cascaded microchips MIC in a same column, the address input pin Di_in of the first level microchip MIC is connected to the address wire ADDRW, and the address output pin Di_out of the N-th level microchip MIC and the address input pin Di_in of the N+1-th level microchip MIC are electrically connected through a cascade line CL, where N is a positive integer. The chip power wire VCCW may supply power to the microchip MIC through the chip power pin VCCP, so that the microchip MIC may obtain the power required for operation. The microchip MIC may obtain the driving data Data from the driving data wire DataW through the data pin DataP. The microchip MIC may obtain the address configuration information through the address input pin Di_in, so as to configure the address information of the microchip MIC. The microchip MIC may generate the address configuration information of the next level microchip MIC and forward the address configuration information to the next level microchip MIC through the address output pin Di_out. In this way, after completing the configuration of the address information of each microchip MIC, the driving configuration information may be loaded to the driving data wire DataW, and each microchip MIC obtains, according to its own address configuration information, the required driving data Data from the driving configuration information, and controls the light-emitting circuit EC in each light emitting zone LEDA according to the driving data Data. When controlling any light-emitting circuit EC, it can be controlled whether or not electrical conduction occurs between the output pin and the ground pin GNDP. When the ground voltage is capable of being loaded to the output pin, the light-emitting circuit EC connected to the output pin is capable of being electrically conductive and emitting light. When the ground voltage is not capable of being loaded to the output pin, the light-emitting circuit EC connected to the output pin is not capable of being electrically conductive and emitting light. In this embodiment, the chip power wire VCCW used for supplying power to the microchip MIC and the driving data wire DataW used for loading the driving configuration information are two different wires. Therefore, the signal communication manner using the power line carrier is not necessary. In the example of FIG. 4, one signal channel CH includes a column of microchips MIC, and microchips MIC in the column are in a cascade relationship. Optionally, each wiring group also includes a floating wiring FBW. The address output pin Di_out of the final level microchip MIC may be electrically connected to the floating wiring FBW, so that the control module CTR can obtain feedback information of each signal channel CH.

In an example, the lamp panel may also be provided with sensors, such as temperature sensors, brightness sensors, etc.; the sensing signals generated by these sensors may be directly sent to the control module CTR or forwarded to the control module CTR through the microchip MIC. The control module CTR may directly adjust, according to these sensing signals, the operating status or operating process of the lamp panel or the backlight module BLU.

In an example, the lamp panel may include a substrate, a driving layer and an element layer that are stacked in sequence. The driving layer is provided with at least one wiring metal layer, and the main material of the wiring metal layer may be copper. The wiring metal layers are isolated by an insulating layer. The insulating layer may be an inorganic insulating layer (such as silicon nitride or silicon oxide), or an organic insulating layer (such as resin), or a stacked inorganic insulating layer and organic insulating layer. The wiring metal layers may be connected by means of vias that pass through the insulating layer. Part of a surface of the wiring metal layer farthest from the substrate is exposed to form a bonding pad for binding electronic elements, such as binding light-emitting elements, microchips MIC and sensors. In actual wiring, in some embodiments, the lamp panel includes two wiring metal layers. Taking FIG. 3 and FIG. 4 as examples, the wires represented by thicker lines are located in a same layer, for example, at a side relatively close to the substrate, and the wires represented by thinner lines are located in a same layer, for example, at a side relatively far away from the substrate.

In an example, the substrate of the lamp panel may be a glass substrate. Furthermore, the lamp panel may be composed of multiple lamp sub-panels spliced together; each lamp sub-panel may operate independently, or multiple lamp sub-panels are controlled by a same control module CTR.

In an example, respective ones of the light-emitting elements emit light in a same color, for example, they are all blue light-emitting elements. A color conversion layer, such as a quantum dot film or a phosphor film, is also provided at the light exit side of the light-emitting element, so that the light emitted by the light-emitting element passes through the color conversion layer to change the color of the light, for example, a blue light is converted into a white light.

In some examples, the backlight module BLU may also be provided with one or more of a diffusion sheet, a brightness enhancement sheet, or other optical film materials, which is not limited by the present disclosure.

In an embodiment of the present disclosure, the liquid crystal display panel PNL may be a large-sized liquid crystal display panel PNL, for example, it may be a display panel with a size not less than 80 inches. In another embodiment, the liquid crystal display panel PNL may be a special shaped panel, for example, a panel with a plurality of different protruding parts. In these embodiments, the liquid crystal display panel PNL may be a spliced liquid crystal display panel PNL, that is, the liquid crystal display panel PNL may include a plurality of display sub-panels spliced to each other to increase the size of the liquid crystal display panel PNL or to adjust the shape of the liquid crystal display panel PNL.

Figure 5:
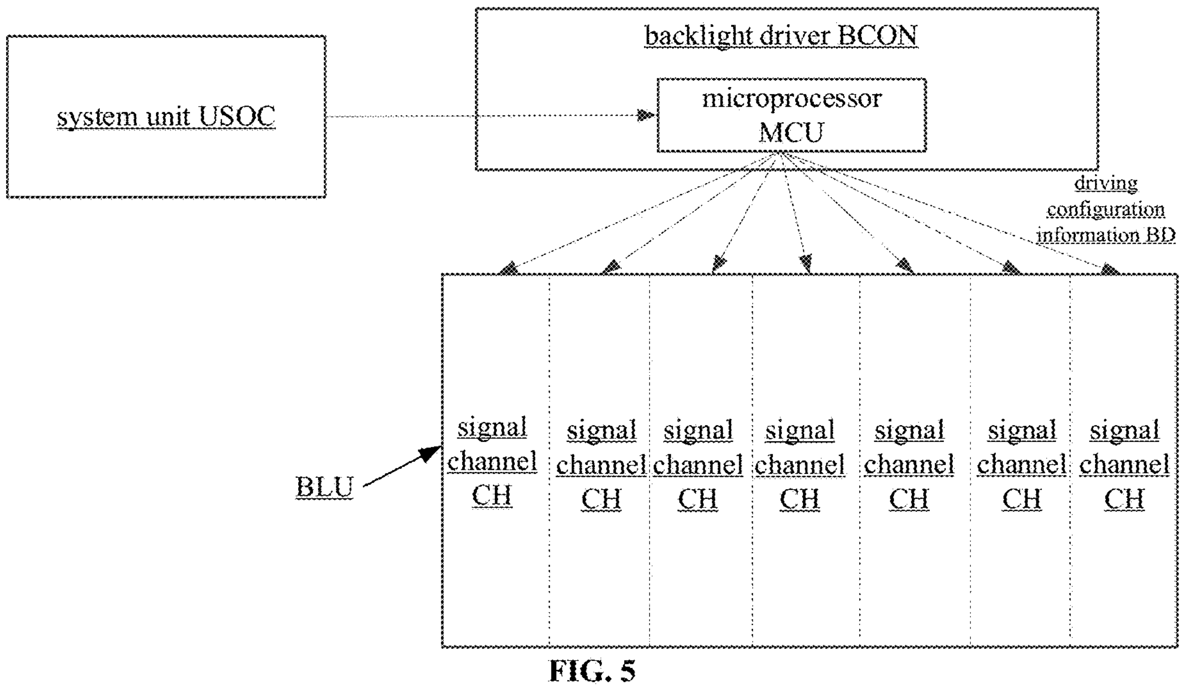
FIG. 5 is a schematic diagram of a control module driving a backlight module according to an embodiment of the present disclosure.

In the liquid crystal display apparatus according to an embodiment of the present disclosure, referring to FIG. 5, the control module CTR includes a system unit USOC and a backlight driver BCON. The system unit USOC may generate, according to image data, backlight synchronization data corresponding to the image data, and the backlight synchronization data includes dimming data corresponding to each light emitting zone LEDA. The backlight driver BCON may receive the backlight synchronization data, and then after data processing processes such as uniformity compensation, data mapping and packing, generate the driving configuration information of each signal channel CH and send the driving configuration information to the signal channel CH. The driving configuration information of any signal channel CH includes the driving data Data of each microchip MIC in the signal channel CH. The microchip MIC receives the driving data Data and controls the brightness of each light emitting zone LEDA according to the driving data Data. In other words, BCON may process the dimming data corresponding to the light emitting zone LEDA and distribute to each microchip MIC the dimming data as processed as the driving data of the microchip MIC.

Optionally, the backlight driver BCON compensates the received dimming data corresponding to each light emitting zone LEDA by looking up a compensation table to obtain the compensated dimming data. When the microchip MIC controls the light emitting zone LEDA according to the compensated dimming data, the accuracy of the brightness of the light emitting zone LEDA can be guaranteed.

Optionally, when the system unit USOC generates the backlight synchronization data, the backlight synchronization data is generated row by row in units of rows where the microchips MIC are located (i.e., the row coordinate information corresponding to physical position coordinates of the microchips MIC on the lamp panel). However, a signal channel is formed by a plurality of microchips MIC arranged in the column direction. After receiving the backlight synchronization data sent in accordance with the dimming data corresponding to the rows of microchips MIC, the backlight driver BCON needs to re-group and re-arrange each piece of the dimming data, in the backlight synchronization data sent row by row, according to a cascade relationship of microchips MIC in each signal channel CH, i.e., perform data mapping. Through data mapping, the backlight driver BCON may reorganize the dimming data according to the unit of the signal channel CH, so that the dimming data required by each light emitting zone LEDA in the same signal channel CH is packaged into the same piece of the driving configuration information.

Optionally, after obtaining the dimming data corresponding to each light emitting zone LEDA in the signal channel CH, the backlight driver BCON may package the data to generate the driving configuration information, and send the driving configuration information to the corresponding signal channel CH, so that the microchips MIC in the signal channel CH receive the required driving data Data and then control the brightness of each light emitting zone LEDA.

In an embodiment of the present disclosure, the system unit USOC may be a system level board, and the system level board is provided with a system level chip. The system level board may receive video data to obtain the image data, and then generate, based on the image data, image synchronization data to be provided to the liquid crystal display panel PNL and backlight synchronization data to be provided to the backlight driver BCON. The source driving circuit of the liquid crystal display panel PNL may receive the image synchronization data and display the image according to the image synchronization data.

In an embodiment of the present disclosure, the backlight driver BCON may be a backlight driving board. The backlight driving board may include one or more circuit boards, and at least include a microprocessor MCU located on the circuit board. The microprocessor MCU may interact directly or indirectly with the system unit USOC. The backlight driver BCON may receive the backlight synchronization data and perform data processing processes such as uniformity compensation, data mapping and packaging for the backlight synchronization data, and then send the driving configuration information of each signal channel CH obtained by packaging to the respective signal channel CH. Since the microprocessor MCU needs to perform data reception, data processing and data sending, it takes a long time for the backlight driver BCON to process one frame, which limits the refresh frequency of the backlight module BLU.

Exemplarily, in a 4K liquid crystal display apparatus, a backlight module BLU includes 2048 light emitting zones LEDA which are arranged in 64 columns and 32 rows. That is, each column of light emitting zones LEDA includes 32 light emitting zones LEDA. In this example, the microchip MIC controls one light emitting zone LEDA, and the microchip MIC obtains the required driving data Data and power from a wire serving as the power wire PWRW and the driving data wire DataW by means of power line carrier communication. One column of light emitting zones LEDA needs to be provided with 32 microchips MIC. Two adjacent columns of microchips MIC share a same driving data wire DataW and are located in a same signal channel CH. Therefore, the backlight module BLU includes 32 signal channels CH, and each signal channel CH includes 64 microchips MIC.

In the related art, the backlight driver BCON generates, in accordance with the following communication protocol, driving configuration information for any signal channel CH, and loads the driving configuration information to the driving data wire DataW of the signal channel CH. It can be understood that in this example, the backlight driving circuit LEDD provides the driving configuration information in a power carrier communication manner and transmits the driving configuration information via the driving data wire DataW.

According to the communication protocol in the related art, the driving configuration information is a digital signal, and information such as Premble, SOP, address information ID, driving data Data1, driving data Data2, . . . , driving data Datan, EOP and the like are sequentially linked and encapsulated into a data packet to constitute the driving configuration information.

The Premble is a starting tag of the driving configuration information, and is used for indicating the starting of the driving configuration information. The EOP is an ending tag of the driving configuration information, and is used for indicating the end of the driving configuration information. The SOP is a protocol tag, and is used for indicating the communication protocol used by the driving configuration information. The address information ID indicates the address information of the microchip MIC corresponding to the first piece of the driving data Data1 in the driving configuration information. The driving data Data1, driving data Data2 . . . and the driving data Datan represent respective pieces of the driving data Data in the driving configuration information. According to the protocol tag SOP, it can be determined that the address stride between two adjacent pieces of the driving data Data corresponding to the driving configuration information is a default stride, which is generally 1. The address information corresponding to each piece of the driving data Data in the driving configuration information may be determined according to the address information ID and the address stride. The microchip MIC obtains, according to the communication protocol, the driving data Data that matches the address information of the microchip MIC. Generally, the backlight driver BCON generates the driving configuration information of the signal channel CH after obtaining each piece of the dimming data required by the signal channel CH. Optionally, in some cases, the microchip MIC may be awakened in response to the Premble, that is, the Premble may also be used as a physical layer wake-up signal of the microchip MIC. In addition to indicating the communication protocol, the SOP may also indicate the start of the packet (start of packet). That is, various subsequent information of the SOP is related to the address information, the address stride, the driving data Data, etc. of the microchip MIC. The EOP may also represent the end of the packet (end of packet).

In this example, the system unit USOC transmits the backlight synchronization data to the backlight driver BCON through a serial peripheral interface (SPI), and the clock frequency of the SPI is 6.5 MHz. Therefore, the time required to transmit the backlight synchronization data through the SPI is 2.431 ms; accordingly, the backlight driver BCON, which operates in a single thread manner, needs to consume 2.431 ms to receive the backlight synchronization data. As a single thread processor, the backlight driver BCON also needs to process the backlight synchronization data, including but not limited to data mapping, uniformity compensation, converting 4*b* encoding to 5*b* encoding, packaging, etc. The data processing takes about 2.4 ms. Respective ones of pieces of the driving configuration information are then respectively loaded to the driving data wires DataW of respective ones of the signal channels CH. In order to avoid electromagnetic interference (EMI) and inrush current, the backlight driver BCON loads respective ones of pieces of the driving configuration information to respective ones of the driving data wires DataW in parallel (in this example, there is one driving data wire DataW in each signal channel), but the starting moment of loading to respective ones of the driving data wires DataW is not the same. Specifically, the starting moments at which two adjacent driving data wires DataW receive the driving configuration information need to be staggered.

Exemplarily, after the backlight driver BCON starts loading the driving configuration information of the q-th driving data wire DataW to the q-th driving data wire DataW, an interval has to be sufficient for transmitting two bytes of data before the backlight driver BCON starts loading the driving configuration information of the q+1-th driving data wire DataW to the q+1-th driving data wire DataW. In this way, compared with the first driving data wire DataW, when the backlight driver BCON starts to load the driving configuration information of the last driving data wire DataW to the last driving data wire DataW, the time has been delayed for a duration long enough to transmit data of (Q−1)*2 bytes*8bits, where Q represents the total number of the driving data wires DataW in the backlight module (namely, the total number of the signal channels). In this example, the plurality of the driving data wires DataW arranged at intervals along the row direction on the lamp panel may be sequentially labeled starting from 1, and the last driving data wire DataW among all the driving data wires DataW is labeled Q. If there is only one driving data wire DataW in a signal channel CH, the label of the driving data wire DataW is also the label of the signal channel. If there are multiple driving data wires DataW in a signal channel, the driving data wires DataW in the same signal channel have the same label, and both receive the driving configuration information loaded by the backlight driver BCON at the same time.

In this example, from the beginning of loading the driving configuration information of the first driving data wire DataW to the first driving data wire DataW to the completion of loading the driving configuration information of the last driving data wire DataW to the last driving data wire DataW, the signal on the last driving data wire DataW include the driving configuration information and a signal before the driving configuration information is started to be loaded. The bit length of the signal before the driving configuration information is started to be loaded is (Q−1)*2 bytes*8bits. The driving configuration information is the driving configuration information converted from being 4b encoded to 5*b* encoded. The driving configuration information includes Premble, SOP, ID, each piece of the driving data Data, and EOP that are encapsulated into a data packet, where Preamble occupies 64 bits, SOP occupies 20 bits, and EOP occupies 8 bits. The original data of ID and the original data of each piece of the driving data Data are 4b encoded, and both have a bit width of 16 bits. After being converted into being 5b encoded by a programmable logic controller PLC, the bit width of ID and the bit width of each piece of the driving data Data become 20 bits.

In this example, each signal channel CH includes 64 microchips MIC, so the driving configuration information includes 64 pieces of the driving data Data. The lamp panel of this example includes 32 signal channels CH. For the last driving data wire DataW (i.e., signal channel CH), the number of bits of the driving configuration information is made to be 64+20+(1+64)*20+8=1392, and the number of bits of the signal before the driving configuration information is started to be loaded is (32−1)*2*8=496. Therefore, from the beginning of loading the driving configuration information of the first driving data wire DataW to the first driving data wire DataW to the completion of loading the driving configuration information of the last driving data wire DataW to the last driving data wire DataW, the number of bits occupied by the signal on the last driving data wire DataW is 1392+496=1888.

In this example, the backlight driver BCON loads the driving configuration information to the driving data wire DataW through the programmable logic controller PLC at a data transmission rate of 700 KHz. Then the time required from the beginning of loading the driving configuration information of the first driving data wire DataW to the first driving data wire DataW to the completion of loading the driving configuration information of the last driving data wire DataW to the last driving data wire DataW is 1888/700 kHz=2.70 ms. Thus, the theoretical maximum refresh frequency of the backlight driver BCON without responding to other operations is 1*1000/(2.431+2.4+2.70)=132 Hz.

Since it takes time for the backlight driver BCON to execute operations like obtaining maximum brightness information data of the lamp panel from the system unit USOC, responding to interruptions, etc., in the process of data processing, the actual refresh rate that can be realized is less than the maximum theoretical refresh rate mentioned above. During design, it is necessary to leave a redundancy of 1.2~1.5 times of the task processing time in the time domain, then the actual refresh rate that can be realized is about 88~110 Hz.

Figure 6:
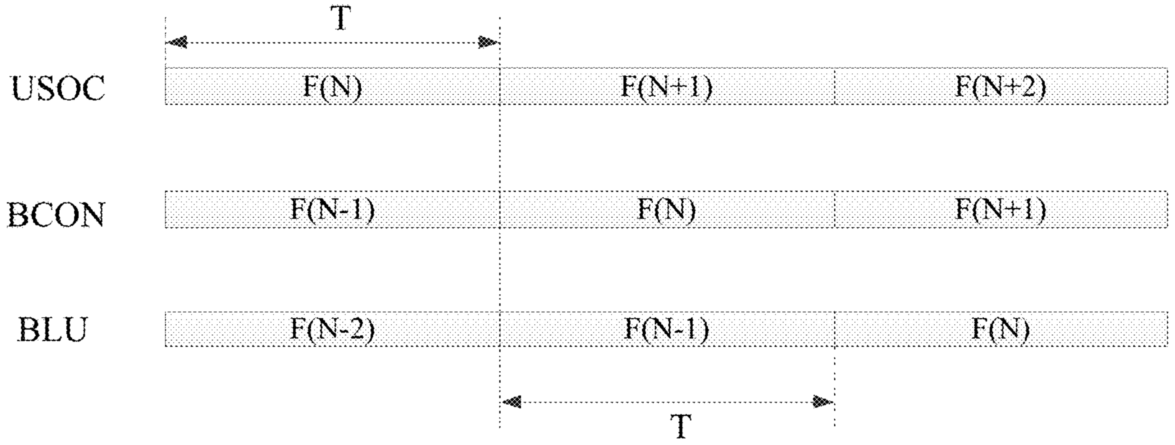
FIG. 6 is a schematic diagram of the principle in which the backlight is delayed by one frame in the related art.

In order to ensure the consistency and synchronization of the refresh rates of the backlight and the display panel, in the case where the refresh rate of the liquid crystal display panel is greater than 120 Hz or even higher, the refresh rate of the backlight is required to be consistent with the refresh rate of the liquid crystal display panel, for example, also be 120 Hz, which cannot be met by the current data transmission method. Although the microprocessor MCU is a single thread task processor, it has a DMA function, which may simultaneously realize SPI data reception and programmable logic controller PLC data sending without consuming system resources. Such manner is not subject to the processing mode of "receiving at the current frame, and sending at the current frame", and the refresh rate can reach 100~125 Hz. However, this implementation manner requires caching of the backlight data corresponding to each frame of the display image, i.e., the backlight data corresponding to the image of the N-th frame will not be received, processed and sent by the microchip MIC until the image of the N+1-th frame is displayed. So the backlight is delayed relative to the display by a length of time of one frame (T) image. For example, referring to FIG. 6, the system unit USOC generates the backlight synchronization data of image data F(N) of the N-th frame and then sends the backlight synchronization data to the backlight driver BCON. Instead of distributing the driving data of each microchip MIC in real time, the backlight driver BCON sends the driving data to the backlight module BLU after a delay of one frame time T. In this way, the response of the backlight module BLU to the image data F(N) of N-th frame is one frame time T later than the generation of the backlight synchronization data by the system unit USOC for the image data of N-th frame. Therefore, this manner is still unable to cope with display products with a large number of partitions and a high refresh rate. Therefore, according to the current data transmission method between the control module CTR and the backlight module BLU, there is a response delay between the liquid crystal display panel PNL and the backlight module BLU, which cannot meet the requirements of a liquid crystal display apparatus with a large number of partitions and a high refresh rate.

In an embodiment of the present disclosure, a driving method for a liquid crystal display apparatus may be provided to reduce the response delay between the backlight module BLU and the liquid crystal display panel PNL, so as to prevent the backlight from being delayed by more than one frame relative to the display.

Figure 7:
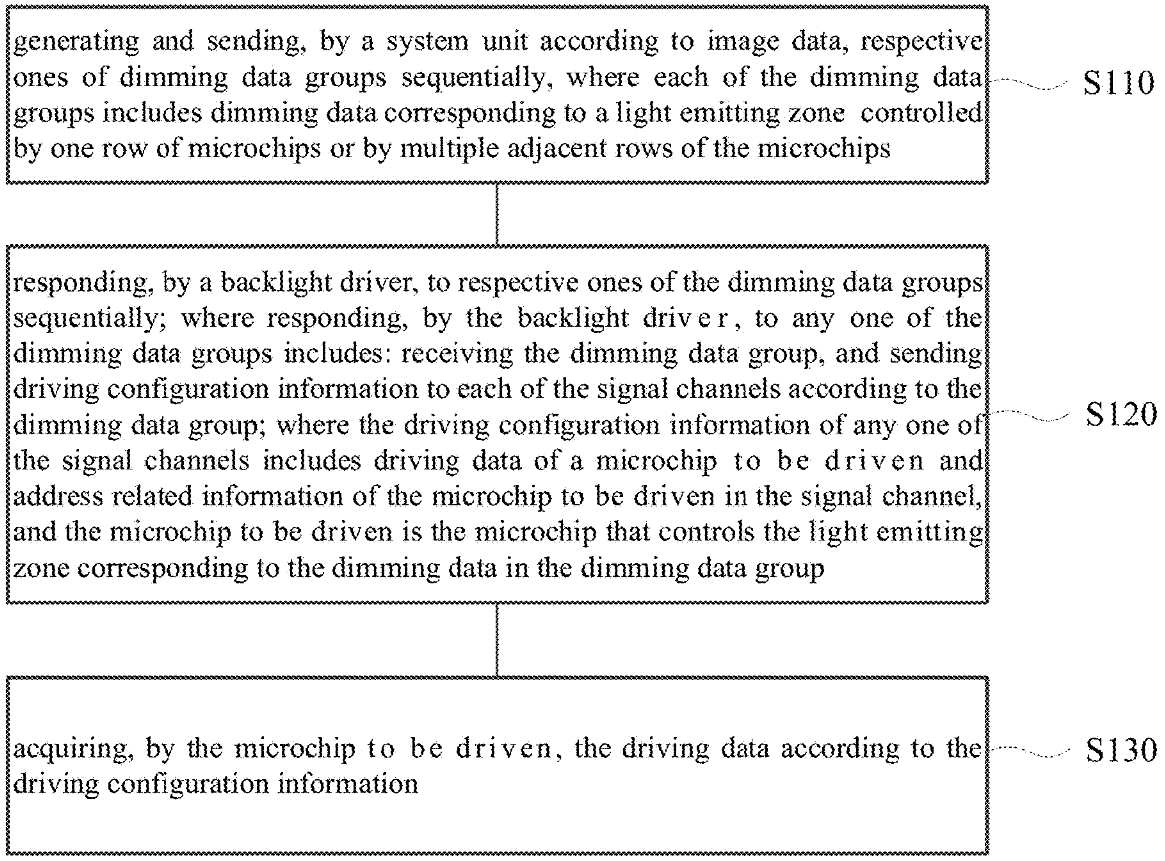
FIG. 7 is a schematic flowchart of a driving method for a liquid crystal display apparatus according to an embodiment of the present disclosure.
Figure 8:
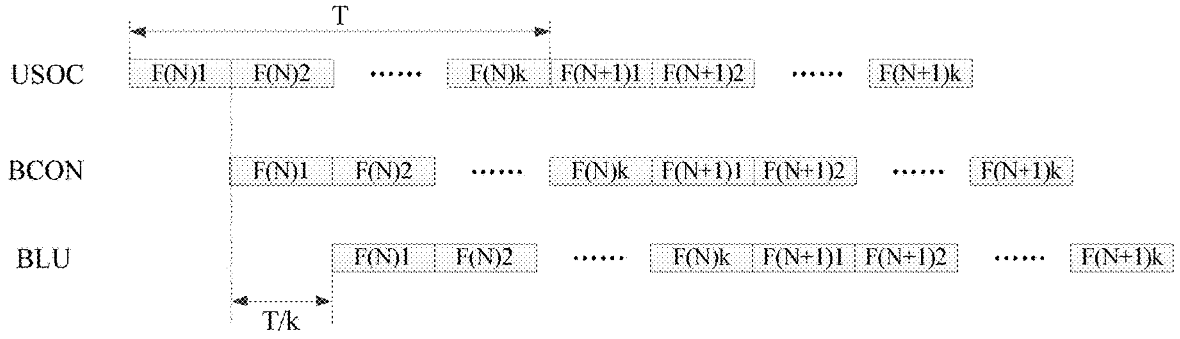
FIG. 8 is a schematic diagram of the principle of reducing a backlight delay time according to an embodiment of the present disclosure.

Referring to FIG. 7 and FIG. 8, the driving method for the liquid crystal display apparatus in this embodiment includes steps S110 to S130.

In step S110, a system unit USOC generates and sends, according to image data, respective ones of dimming data groups sequentially. Each of the dimming data groups includes dimming data corresponding to light emitting zones controlled by one row of microchips or by multiple adjacent rows of the microchips.

In step S120, a backlight driver BCON responds to respective ones of the dimming data groups sequentially. The backlight driver BCON responding to any one of the dimming data groups includes receiving the dimming data group, and sending driving configuration information to each of the signal channels CH according to the dimming data group. The driving configuration information of any one of the signal channels CH includes driving data Data of a selected microchip DMIC and information related to an address of the selected microchip DMIC in the signal channel CH, and the selected microchip DMIC is a microchip MIC that controls the light emitting zone LEDA corresponding to the dimming data in the dimming data group (the light emitting zone LEDA corresponding to the dimming data in the dimming data group is a selected light emitting zone, and the microchip MIC that controls the selected light emitting zone is the selected microchip DMIC).

In step S130, the selected microchip DMIC acquires the driving data Data according to the driving configuration information.

In the related art, the system unit USOC needs to first determine the backlight synchronization data of image data of one frame according to the image data of the one frame image. The backlight synchronization data includes the dimming data required by respective ones of the light emitting zones LEDA of the backlight module BLU. In step S110 of the embodiment of the present disclosure, however, the backlight synchronization data does not need to include dimming data corresponding to all light emitting zones LEDA. Instead, the system unit USOC determines the dimming data required by the light emitting zones LEDA corresponding to certain rows of pixels according to the data of these rows of pixels in a certain frame image, and then sends the dimming data as a dimming data group to the backlight driver BCON in time, which can improve the response synchronization between the liquid crystal display panel PNL and the backlight module BLU. Further, the system unit USOC sends the dimming data group to the backlight driver BCON through the SPI. In this way, the system unit USOC can promptly forward the dimming data corresponding to the above-mentioned light emitting zones LEDA to the backlight driver BCON, so that the microchip MIC that controls these light emitting zones LEDA can obtain the corresponding driving data Data in a more timely manner, thereby enabling these microchips MIC to control the brightness of the above-mentioned light emitting zones LEDA in a more timely manner, which provides a basis for reducing the response delay between the liquid crystal display panel PNL and the backlight module BLU.

In an example, the system unit USOC may send the dimming data required by one row of microchips MIC as a dimming data group to the backlight driver BCON. That is, the dimming data group corresponds to a plurality of light emitting zones LEDA controlled by the row of microchips MIC. The dimming data required by the row of microchips MIC is the dimming data corresponding to at least one light emitting zone LEDA controlled by each microchip MIC in the row of microchips MIC. It can be understood that when one microchip MIC controls one light emitting zone LEDA, the dimming data required by the row of microchips MIC is the dimming data corresponding to each light emitting zone LEDA controlled by each microchip MIC in the row of microchips MIC; when one microchip MIC controls at least two light emitting zones LEDA arranged along the row direction, the dimming data required by the row of microchips MIC is the dimming data corresponding to all light emitting zones LEDAs controlled by each microchip MIC in the row of microchips MIC; when one microchip MIC controls at least two light emitting zones LEDA arranged along the column direction, the dimming data required by the row of microchips MIC is the dimming data corresponding to one light emitting zone LEDA controlled by each microchip MIC in the row of microchips MIC; and when one microchip MIC controls multiple light emitting zones LEDA arranged along the row and column directions, the dimming data required by the row of microchips MIC is the dimming data corresponding to at least two light emitting zones LEDAs arranged along the row direction controlled by each microchip MIC in the row of microchips MIC.

In another example, the system unit USOC may send the dimming data required by a plurality of rows of microchips MIC as a dimming data group to the backlight driver BCON. That is, the dimming data group corresponds to a plurality of light emitting zones LEDA controlled by the plurality of rows of microchips MIC. The dimming data required by the plurality of rows of microchips MIC is the dimming data corresponding to at least one light emitting zone LEDA controlled by each microchip MIC in the plurality of rows of microchips MIC. It can be understood that when one microchip MIC controls one light emitting zone LEDA, the dimming data required by the plurality rows of microchips MIC is the dimming data corresponding to each light emitting zone LEDA controlled by each microchip MIC in the plurality of rows of microchips MIC; when one microchip MIC controls at least two light emitting zones LEDA arranged along the row direction, the dimming data required by the plurality of rows of microchips MIC is the dimming data corresponding to all light emitting zones LEDAs controlled by each microchip MIC in the plurality of rows of microchips MIC; when one microchip MIC controls at least two light emitting zones LEDA arranged along the column direction, the dimming data required by the plurality of rows of microchips MIC is the dimming data corresponding to all light emitting zones LEDA controlled by each microchip MIC in the plurality of rows of microchip MIC, or the dimming data corresponding to at least one light emitting zone LEDA controlled by each microchip MIC in the plurality rows of microchips MIC; and when one microchip MIC controls multiple light emitting zones LEDA arranged along the row and column directions, the dimming data required by the plurality of rows of microchips MIC is the dimming data corresponding to all light emitting zones LEDA controlled by each microchip MIC in the plurality of rows of microchip MIC, or the dimming data corresponding to at least four light emitting zones LEDA arranged along the row and column directions controlled by each microchip MIC in the plurality rows of microchips MIC.

Correspondingly, an embodiment of the present disclosure may also provide a system unit USOC that is capable of implementing the above functions. The system unit USOC may generates and sends, according to the image data, respective ones of dimming data groups sequentially, where each of the dimming data groups includes dimming data corresponding to a plurality of light emitting zones controlled by one row of microchips or by multiple adjacent rows of the microchips. The dimming data group may be responded to by the backlight driver BCON and used for driving each microchip MIC. In other words, after the system unit USOC generates a dimming data group, the dimming data group may be sent. The system unit USOC splits the backlight synchronization data corresponding to the image data of one frame into a plurality of dimming data groups and sends them separately, and sends the dimming data group after each dimming data group is generated, so that the backlight driver BCON can receive the signal in time, thereby enabling the backlight module BLU to provide brightness corresponding to the display image in a more timely manner, and reducing the response delay between the liquid crystal display panel PNL and the backlight module BLU.

In step S120, the backlight driver BCON may respond to the dimming data group as soon as the dimming data group is received. The response includes, but is not limited to, performing data processing on the dimming data group to generate the driving configuration information of each signal channel CH, and loading the driving configuration information to the corresponding signal channel CH, specifically to the driving data wire DataW of the signal channel CH. In this way, the backlight driver BCON does not need to receive respective ones of pieces of the dimming data corresponding to the image data of one frame before distributing the dimming data, but instead distributes each piece of the dimming data of the dimming data group to the microchip MIC of the backlight module BLU in a timely manner after receiving the dimming data group, so that the microchip MIC can dim in a timely manner in response to the dimming data. Accordingly, this also eliminates the need for each microchip MIC to wait for the dimming data of all microchip MICs to be confirmed before dimming, which reduces the overall time between the generation of the dimming data by the system unit USOC and the control of the brightness of corresponding light emitting zones LEDA by the microchips MIC according to the dimming data, thereby reducing the response delay between the liquid crystal display panel PNL and the system unit USOC, which is beneficial to improving the refresh rate of the liquid crystal display apparatus. It can be understood that if the microchip MIC communicates through a manner of the power line carrier, the driving configuration information also needs to be provided by the backlight driving circuit LEDD through the manner of power carrier communication and transmitted by the driving data wire DataW.

In an embodiment of the present disclosure, the driving data Data of the microchip MIC that controls one light emitting zone LEDA may be determined according to the dimming data corresponding to the light emitting zone LEDA; alternatively, the driving data Data of the microchip MIC is determined according to the dimming data corresponding to a plurality of light emitting zones LEDA controlled by the same microchip MIC. Due to the existence of data compensation, data packaging and other processes, the data format and the data information of the dimming data and those of the driving data Data are not exactly the same, but there is a clear mapping relationship between the dimming data and the driving data Data. By way of example, in an exemplary embodiment, the dimming data is information related to the brightness of each light emitting zone LEDA that is controlled by the microchip MIC, such as the conducting duration of the electrical path(s) formed by each light emitting zone LEDA and the microchip MIC and/or the current signal amplitude in the electrical path(s) formed by each light emitting zone LEDA and the microchip MIC. The backlight driver BCON may determine the driving data Data of the microchip MIC according to the expected brightness of each light emitting zone LEDA that is controlled by the microchip MIC.

In an embodiment of the present disclosure, the driving data Data of another microchip MIC other than the selected microchip DMIC is not included in the backlight configuration data. In other words, depending on which light emitting zones LEDA have dimming data involved in the dimming data group, the driving configuration information only includes the driving data Data of the microchip MIC that controls these light emitting zones LEDA. In this way, the driving configuration information does not need to provide driving data Data for each microchip MIC in the same signal channel CH, which can effectively reduce the length of the driving configuration information, thereby reducing the time it takes for the backlight driver BCON to load the driving configuration information to the driving data wire DataW, and avoiding generation of delay and reduced refresh rate due to a long time taken by the backlight driver BCON to load the driving configuration information to the driving data wire DataW.

Figure 13:
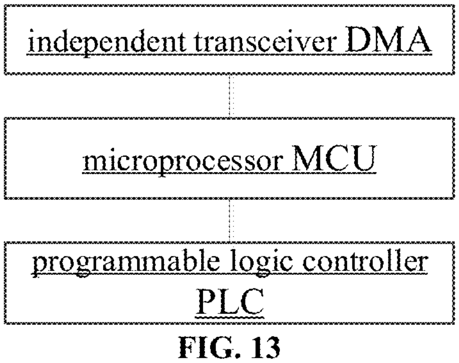
FIG. 13 is a schematic diagram of the principle of a backlight driver according to an embodiment of the present disclosure.

In an embodiment of the present disclosure, referring to FIG. 13, the backlight driver BCON is provided with an independent transceiver DMA. The backlight driver BCON may receive a current dimming data group and process a previous dimming data group at the same time. For example, the liquid crystal display panel PNL provides signals to the pixel electrodes in the pixel area in a progressive scanning manner. One frame time refers to the time it takes to complete scanning of all rows of pixel areas of the liquid crystal display panel PNL. Multiple subframes may be included in one frame. One subframe refers to the time required to complete the scanning of M rows of pixel areas from the pixel area of the i-th row to the pixel area of the j-th row (i, j are both positive integers, and j≥i). The backlight of every M rows of pixel areas (M is a positive integer) is controlled by one row of light emitting zones, then one dimming data group at least includes the brightness related information of a row(s) of light emitting zones corresponding to every a*M row(s) of pixel areas (where a is a positive integer). Referring to FIG. 8, if one frame time is T, the system unit USOC in this embodiment divides the backlight synchronization data corresponding to one frame image into k dimming data groups (where k is a positive integer, and a*M*k is equal to the total number of rows of the pixel area on the liquid crystal display panel), the system unit USOC sends the dimming data groups to the backlight driver BCON one by one, and each dimming data group corresponds to the pixel area row(s) scanned by one subframe. For example, the backlight synchronization data of the image data of the N-th frame is divided, according to the order in which the dimming data groups are generated, into a first dimming data group F(N)1, a second dimming data group F(N)2, and the like up to a k-th dimming data group F(N)k. Each dimming data group is sent to the backlight driver BCON as soon as the dimming data group is generated. The backlight driver BCON receives the dimming data group and delays the distribution of each piece of the dimming data (i.e., sends the driving configuration information based on the dimming data group) by one subframe. The delay between each piece of the driving configuration information and the dimming data group is T/k, which greatly shortens the delay. For example, the backlight driver BCON, after receiving the first dimming data group F(N)1 corresponding to the first subframe image in the image data of the N-th frame, delays the distribution of the data to the signal channel CH by a time of T/k, i.e., delays loading the driving configuration information based on the first dimming data group F(N)1 to the backlight module BLU by one subframe. In this way, the response of the backlight module BLU to the first dimming data group F(N)1 corresponding to the first subframe image in the image data of the N-th frame is generated T/k later than the generation time of the first dimming data group F(N)1 corresponding to the first subframe image in the image data of the N-th frame. This shortening of delay enables the liquid crystal display apparatus to maintain a better display effect at a higher refresh rate and with a larger number of light emitting zones. It can be understood that the subframe image refers to an image area corresponding to the pixel area row(s) scanned in one subframe, and a certain frame image is composed of a plurality of subframe images.

In an embodiment of the present disclosure, the driving configuration information includes a protocol tag and at least one configuration data group. Any one of the configuration data groups includes starting address information SID and at least one piece of the driving data Data that are arranged sequentially. The starting address information SID is address information corresponding to a first piece of the driving data Data, the address information corresponding to the first piece of the driving data Data is capable of being used for determining address information corresponding to other driving data Data, and the protocol tag is used for marking a communication protocol used by the driving configuration information. Further, the driving configuration information is a digital signal, for example, a binary-encoded data packet.

In this way, the backlight driver BCON may generate, according to the communication protocol, the driving configuration information with the protocol tag and the configuration data group. The microchip MIC may parse the driving configuration information according to the communication protocol corresponding to the protocol tag. In the process of generating the configuration data group, the backlight driver BCON may generate the configuration data group according to the address related information of the selected microchip DMIC and the driving data Data of the selected microchip DMIC, which makes the configuration data group include the starting address information SID and at least one piece of the driving data Data. When parsing the configuration data group, the microchip MIC may determine whether to receive the driving data Data based on the address related information in the configuration data group. If the microchip MIC determines to receive the driving data Data, the microchip MIC obtains the driving data Data distributed to itself, and controls the light emitting zone LEDA according to the driving data Data.

In an embodiment of the present disclosure, the address related information refers to information related to the address information. For example, the address related information may be the address information directly; or the address related information may also be the address information obtained by combining another piece of the address information with other information. For example, in some cases, according to the communication protocol, the address information corresponding to part of the driving data Data is the address information determined based on the known address information and the address stride.

In an embodiment of the present disclosure, the address information may be the number of a microchip MIC in a signal channel CH, for example, the cascade serial number in multiple cascaded microchips MIC. In this way, the address information between two adjacent microchips MIC differs by 1.

In the present disclosure, the driving configuration information includes the protocol tag used for marking the type of the communication protocol. The backlight driver BCON also needs to select a specific communication protocol according to the address information corresponding to each piece of the dimming data in the dimming data group, and generate the driving configuration information according to the communication protocol. Accordingly, the generated driving configuration information includes the protocol tag of the selected communication protocol. After receiving the driving configuration information, the microchip MIC selects, according to the protocol tag, the communication protocol used for parsing the driving configuration information, so as to obtain the address information corresponding to each piece of the driving data Data from the driving configuration information. When the address information corresponding to a certain piece of the driving data Data matches the address information of the microchip MIC, the microchip MIC obtains the driving data Data to drive the light-emitting circuit EC in the light emitting zone LEDA according to the driving data Data. Further, the driving configuration information also includes a starting tag Premble located at the starting position and an ending tag EOP located at the ending position. The tags, address related information and driving data Data of the driving configuration information may all be binary encoded. Exemplarily, the starting tag Premble may be a 64-bit binary code, the protocol tag may be a 20-bit binary code, and the ending tag EOP may be an 8-bit binary code. Any of the starting address information SID, address stride and driving data Data may be a 20-bit binary code.

In an example, the starting tag, the protocol tag, the configuration data groups, and the ending tag are arranged sequentially, for example, linked sequentially and encapsulated into a data packet.

In an embodiment of the present disclosure, a first communication protocol is configured in both the backlight driver BCON and the microchip MIC. Of course, the first communication protocol in the backlight driver BCON is a communication protocol that realizes encoding of the driving configuration information, and the first communication protocol in the microchip MIC is a communication protocol that realizes decoding of the driving configuration information.

According to the first communication protocol, the backlight driver BCON may generate first driving configuration information and send the first driving configuration information to the driving data wire DataW. The microchip MIC may receive and parse the first driving configuration information on the driving data wire DataW.

In this embodiment, the driving configuration information includes the first driving configuration information. The first driving configuration information includes a first protocol tag SOP1 and the at least one configuration data group that are arranged sequentially. The configuration data group of the first driving configuration information includes a starting address information SID, an address stride and a plurality of pieces of the driving data Data that are arranged sequentially. In a same configuration data group, the starting address information SID is the smallest address information among the address information corresponding to the plurality pieces of the driving data Data. The address stride is a difference between address information corresponding to a subsequent piece of the driving data Data and address information corresponding to a previous piece of the driving data Data. In the driving configuration information, the first protocol tag SOP1 indicates that the communication protocol used by the driving configuration information is the first communication protocol. In the first communication protocol, the address information corresponding to each piece of the driving data Data in the same configuration data group is arranged in equal difference; and the address stride may be set independently in each configuration data group, and the address stride may be the same or different. Optionally, when the dimming data group includes the dimming data corresponding to one row of the microchips MIC, the driving configuration information generated according to the dimming data group is the first driving configuration information, i.e., the backlight driver BCON generates the driving configuration information according to the first communication protocol.

Figure 9:
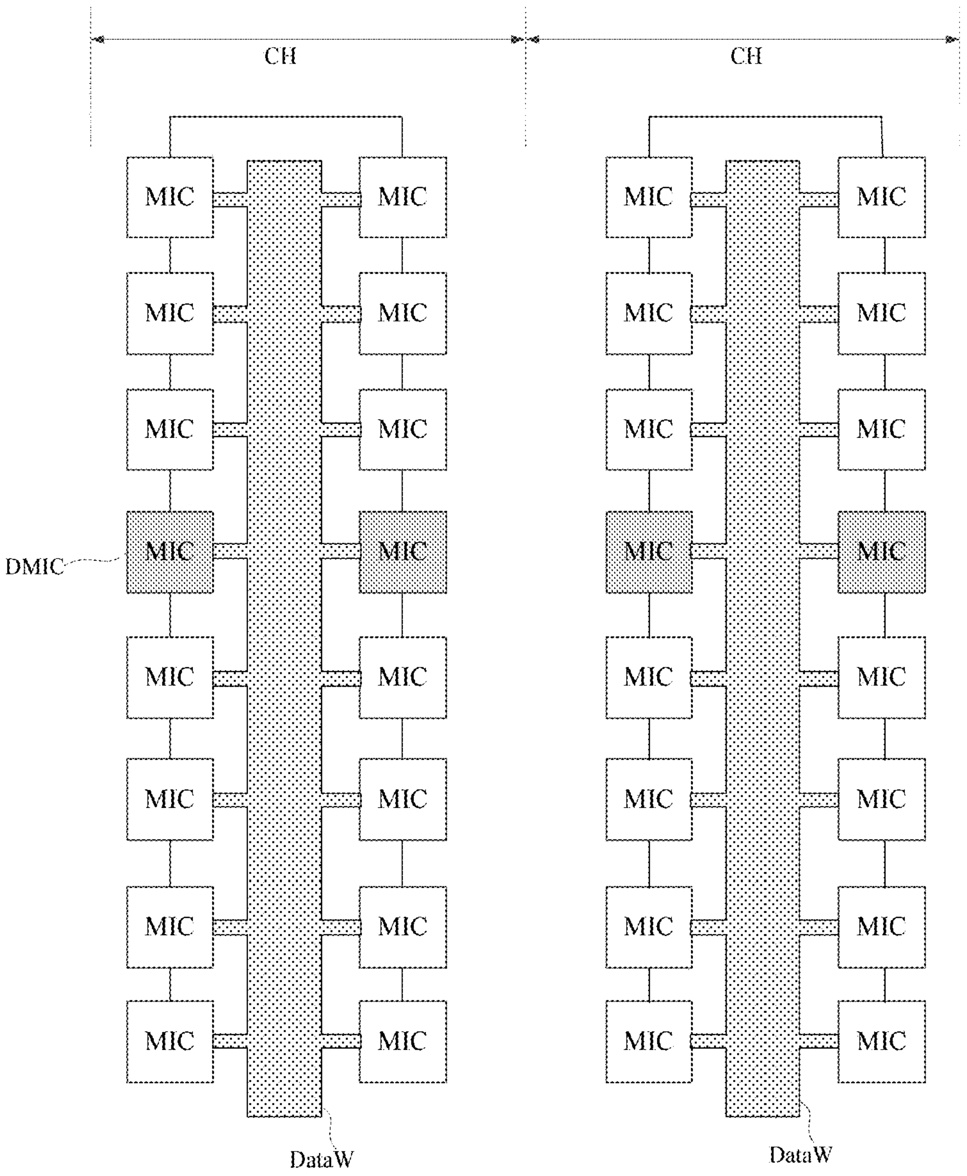
FIG. 9 is a schematic diagram of positions of selected microchips in signal channels according to an embodiment of the present disclosure.

As an example, in the lamp panel shown in FIG. 9, one signal channel CH includes an even number of columns of microchips MIC, where two adjacent columns of microchips MIC serve as a microchip column group and are cascaded in a U-shaped or inverted U-shaped sequence. For example, in the same microchip column group, microchips MIC in a microchip MIC column are cascaded sequentially along the column direction starting from the microchip MIC closest to the bottom to the microchip MIC at the top end, then the microchip MIC at the top end is connected to an adjacent microchip MIC in the other microchip MIC column, and microchips MIC in that microchip MIC column are enabled to be cascaded sequentially. When the dimming data group sent by the system unit USOC corresponds to one row of microchips MIC, only one microchip MIC is the selected microchip DMIC in each microchip MIC column, and each selected microchip DMIC is located in the same row. In this way, in the same signal channel CH, the distance between the address information (i.e., the difference of the address stride) of two selected microchips DMIC in the same microchip column group may be used as the address stride, and the driving data Data of those two adjacent selected microchips DMIC may be used as the driving data Data in the same configuration data group. In this way, the driving configuration information of the signal channel CH may include: the starting tag Premble+the first protocol tag SOP1+each configuration data group+the ending tag EOP. Any configuration data group includes the starting address information SID, the address stride and two pieces of the driving data Data that are arranged sequentially. The first protocol tag SOP1 indicates that the communication protocol used by the driving configuration information is the first communication protocol. The starting address information SID represents the lowest piece of the address information corresponding to the two pieces of the driving data Data of the configuration data group. The address stride represents the difference between the address information corresponding to two adjacent pieces of the driving data Data. The driving data Data refers to the driving data Data of each of the two selected microchips DMIC in the same microchip column group.

In an embodiment of the present disclosure, a second communication protocol is configured in both the backlight driver BCON and the microchip MIC. Of course, the second communication protocol in the backlight driver BCON is a communication protocol that realizes encoding of the driving configuration information, and the second communication protocol in the microchip MIC is a communication protocol that realizes decoding of the driving configuration information. According to the second communication protocol, the backlight driver BCON may generate the second driving configuration information and send the second driving configuration information to the driving data wire DataW. The microchip MIC may receive and parse the second driving configuration information on the driving data wire DataW.

In this embodiment, the driving configuration information includes the second driving configuration information. The second driving configuration information includes a second protocol tag SOP2, an address stride and the at least one configuration data group. The address stride is a difference between address information corresponding to a subsequent piece of the driving data Data and address information corresponding to a previous piece of the driving data Data that are in a same configuration data group. In the driving configuration information, the second protocol tag SOP2 indicates that the communication protocol used by the driving configuration information is the second communication protocol. In the second communication protocol, the address information corresponding to each piece of the driving data Data in the same configuration data group is arranged in equal difference, and each configuration data group has the same address stride. Optionally, when the dimming data group includes the dimming data corresponding to a plurality rows of microchips MIC (i.e., the dimming data corresponding to light emitting zones LEDA controlled by the plurality rows of microchips MIC), the driving configuration information generated according to the dimming data group is the second driving configuration information, i.e., the backlight driver BCON generates the driving configuration information according to the second communication protocol.

Figure 10:
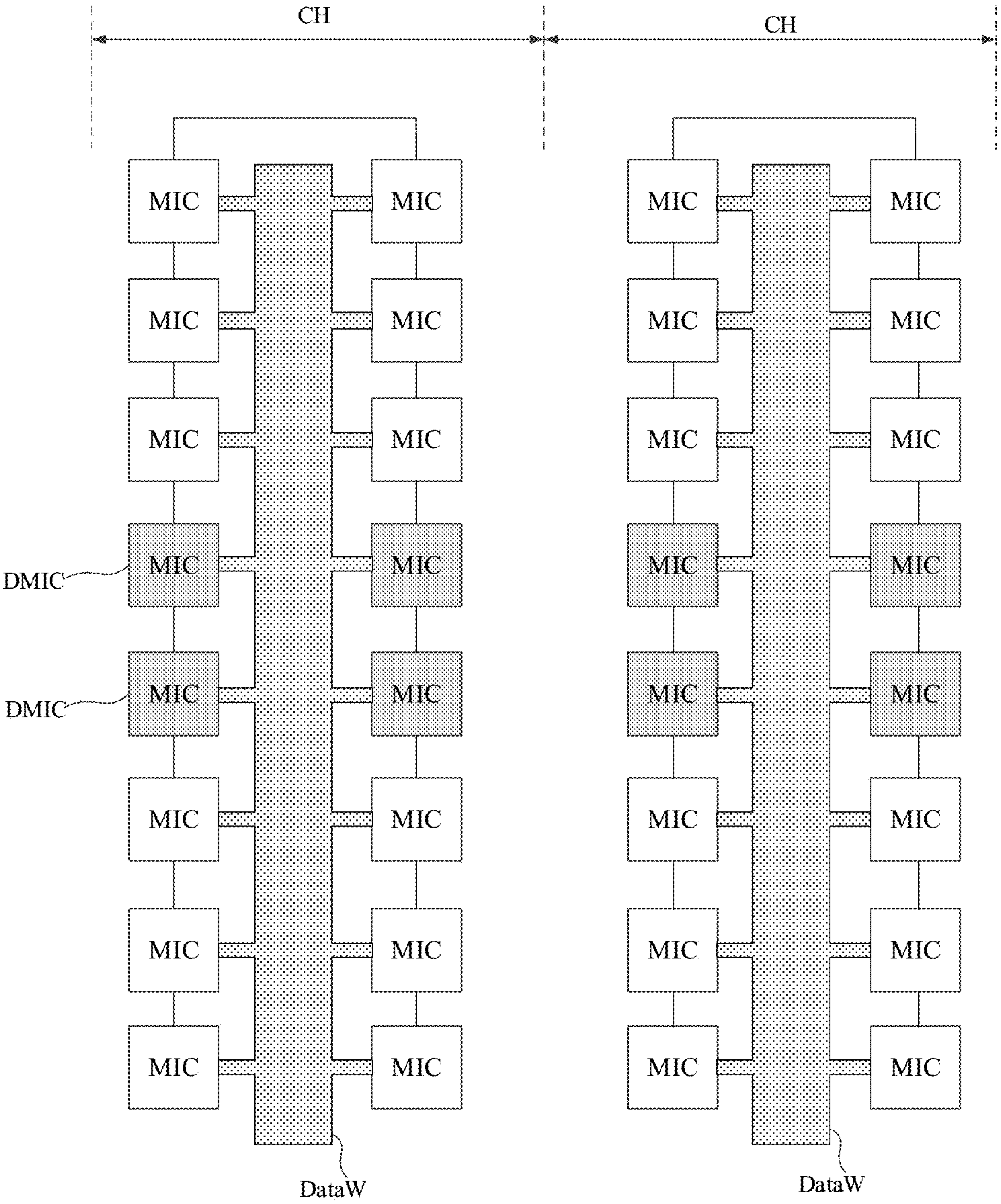
FIG. 10 is a schematic diagram of positions of selected microchips in signal channels according to an embodiment of the present disclosure.

As an example, in the lamp panel shown in FIG. 10, one signal channel CH includes an even number of columns of microchips MIC, where two adjacent columns of microchips MIC serve as a microchip column group and are cascaded in a U-shaped or inverted U-shaped sequence. For example, in the same microchip column group, microchips MIC in a microchip MIC column are cascaded sequentially along the column direction starting from the microchip MIC closest to the bottom to the microchip MIC at the top end, then the microchip MIC at the top end is connected to an adjacent microchip MIC in the other microchip MIC column, and microchips MIC in that microchip MIC column are enabled to be cascaded sequentially. When the dimming data group sent by the system unit USOC corresponds to a plurality rows of microchips MIC (i.e., the dimming data in the dimming data group is the dimming data corresponding to the light emitting zones LEDA controlled by the plurality of rows of microchips MIC), for example, corresponding to two adjacent rows of microchips MIC, then there are two selected microchips DMIC in each microchip MIC column, and the difference in the address information of the two selected microchips DMIC is 1. The driving data Data of each selected microchip DMIC in the same microchip MIC column may be used as the driving data Data in the same configuration data group, and the smallest piece of the address information of selected microchips DMIC is used as the starting address information SID. In this way, the driving configuration information of the signal channel CH may include: the starting tag Premble+the second protocol tag SOP2+the address stride+each configuration data group+the ending tag EOP. The second protocol tag SOP2 indicates that the communication protocol used by the driving configuration information is the second communication protocol. The address stride represents the difference between the address information corresponding to two adjacent pieces of the driving data Data in the same configuration data group (the address stride is 1 in this example). Each configuration data group includes the starting address information SID and a plurality of pieces of the driving data Data. The starting address information SID is the smallest piece of the address information among the plurality of pieces of the driving data Data. The driving data Data refers to the driving data Data of the plurality of selected microchips DMIC in one microchip column group.

In some embodiments of the present disclosure, the backlight driver BCON may send the driving configuration information to each of the signal channels CH according to the following method:

determining, according to a position of the light emitting zone LEDA corresponding to each piece of the dimming data in the dimming data group as received, address information of the microchip MIC that controls the light emitting zone LEDA in any one of the signal channels CH; determining, according to the address information, the communication protocol used for generating the driving configuration information of each of the signal channels CH; and generating and sending, according to the communication protocol as determined, the driving configuration information of each of the signal channels CH.

Further, when the address information determined in any of the signal channels CH is the address information of microchips MIC of a same row, the dimming data group includes the dimming data corresponding to the light emitting zones LEDA controlled by one row of the microchips MIC, the first communication protocol may be determined as the communication protocol for generating the driving configuration information of each of the signal channels CH in this case. When the address information determined in any of the signal channels CH is the address information of a plurality of rows of microchips MIC, the dimming data group includes the dimming data corresponding to the light emitting zones LEDA controlled by the plurality of rows of the microchips MIC, the second communication protocol may be determined as the communication protocol for generating the driving configuration information of each of the signal channels CH in this case.

In some embodiments of the present disclosure, the acquiring, by the selected microchip DMIC, the driving data Data according to the driving configuration information includes:

receiving, by a microchip MIC, the driving configuration information; determining, according to the protocol tag of the driving configuration information, a communication protocol selected for decoding the driving configuration information; acquiring, according to the communication protocol as determined, address information corresponding to each piece of the driving data Data in the driving configuration information; and acquiring, by the microchip MIC when the address information corresponding to the driving data Data matches address information of the microchip MIC, the driving data Data, thereby the microchip MIC serving as the selected microchip DMIC.

Optionally, when the protocol tag of the driving configuration information is the first protocol tag SOP1, the first communication protocol is determined to be the communication protocol selected for decoding the driving configuration information. When the protocol tag of the driving configuration information is the second protocol tag SOP2, the second communication protocol is determined to be the communication protocol selected for decoding the driving configuration information.

Figure 11:
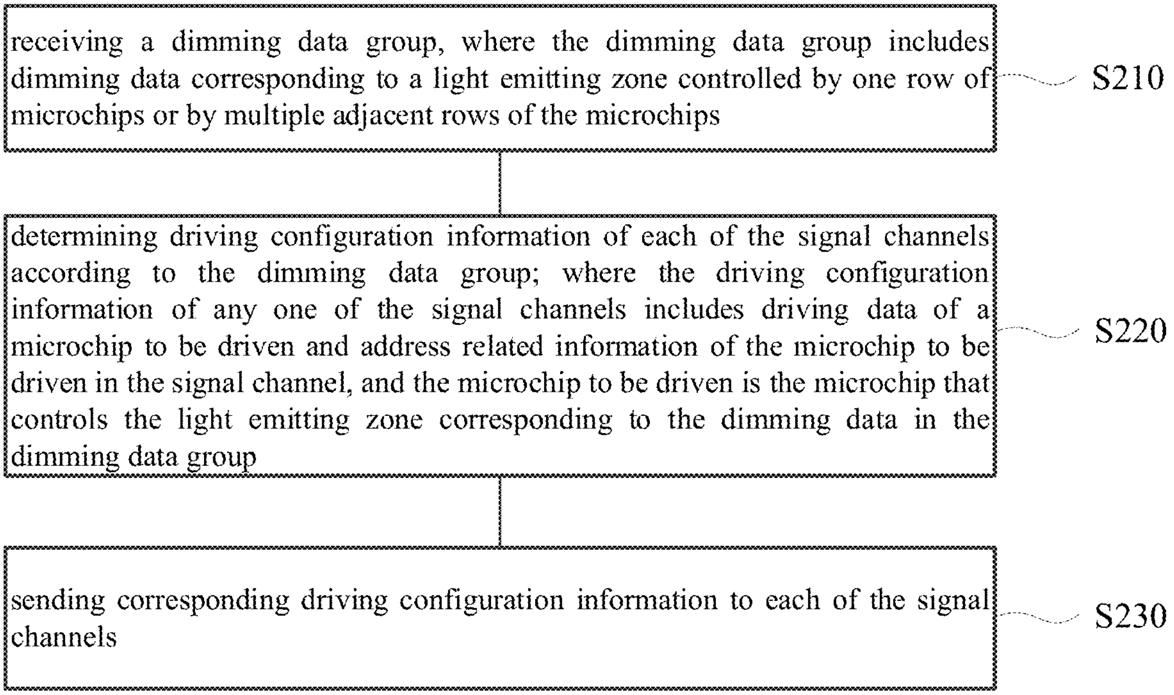
FIG. 11 is a schematic flowchart of a data transmission method applied to a backlight driver according to an embodiment of the present disclosure.

The present disclosure further provides a data transmission method, referring to FIG. 11, the data transmission method may be applied to a backlight driver BCON to drive the backlight module BLU. The data transmission method includes the following steps S210 to S230.

In step S210, a dimming data group is received. The dimming data group includes dimming data corresponding to a light emitting zone LEDA controlled by one row of microchips MIC or by multiple adjacent rows of the microchips MIC.

In step S220, driving configuration information of each of the signal channels CH is determined according to the dimming data group. The driving configuration information of any one of the signal channels CH includes driving data Data of a selected microchip DMIC and address related information of the selected microchip DMIC in the signal channel CH. The selected microchip DMIC is the microchip MIC that corresponds to the dimming data in the dimming data group.

In step S230, corresponding driving configuration information is sent to each of the signal channels CH.

In an example, the driving configuration information does not include driving data Data of another microchip MIC other than the selected microchip DMIC.

In an example, the driving configuration information includes at least one configuration data group; any configuration data group includes starting address information SID and at least one piece of the driving data Data that are arranged sequentially; where the starting address information SID is address information corresponding to a first piece of the driving data Data, and the address information corresponding to the first piece of the driving data Data is capable of being used for determining address information corresponding to other driving data Data.

In an example, the driving configuration information further includes a starting tag, a protocol tag and an ending tag arranged sequentially; each configuration data group is located between the protocol tag and the ending tag; and the protocol tag is used for marking a communication protocol used by the driving configuration information.

In an example, the driving configuration information includes first driving configuration information, the first driving configuration information includes a first protocol tag SOP1 and the at least one configuration data group that are arranged sequentially, and the configuration data group of the first driving configuration information includes the starting address information SID, an address stride and a plurality of pieces of the driving data Data that are arranged sequentially. In a same configuration data group, the address stride is a difference between address information corresponding to a subsequent piece of the driving data Data and address information corresponding to a previous piece of the driving data Data.

In an example, the driving configuration information includes second driving configuration information, and the second driving configuration information includes a second protocol tag SOP2, an address stride and the at least one configuration data group. The address stride is a difference between address information corresponding to a subsequent piece of the driving data Data and address information corresponding to a previous piece of the driving data Data that are in a same configuration data group.

In an example, the sending the driving configuration information to each of the signal channels CH according to the dimming data group includes:

determining, according to a position of the light emitting zone LEDA corresponding to each piece of the dimming data in the dimming data group as received, address information of the microchip MIC that controls the light emitting zone LEDA in any one of the signal channels CH;

determining, according to the address information as determined, the communication protocol used for generating the driving configuration information of each of the signal channels CH; and generating and sending, according to the communication protocol as determined, the driving configuration information of each of the signal channels CH.

The details and effects of each step of the data transmission method in the embodiment of the present disclosure are introduced in detail in the above-mentioned embodiment of the driving method for the liquid crystal display apparatus, and will not be repeated herein.

Figure 12:
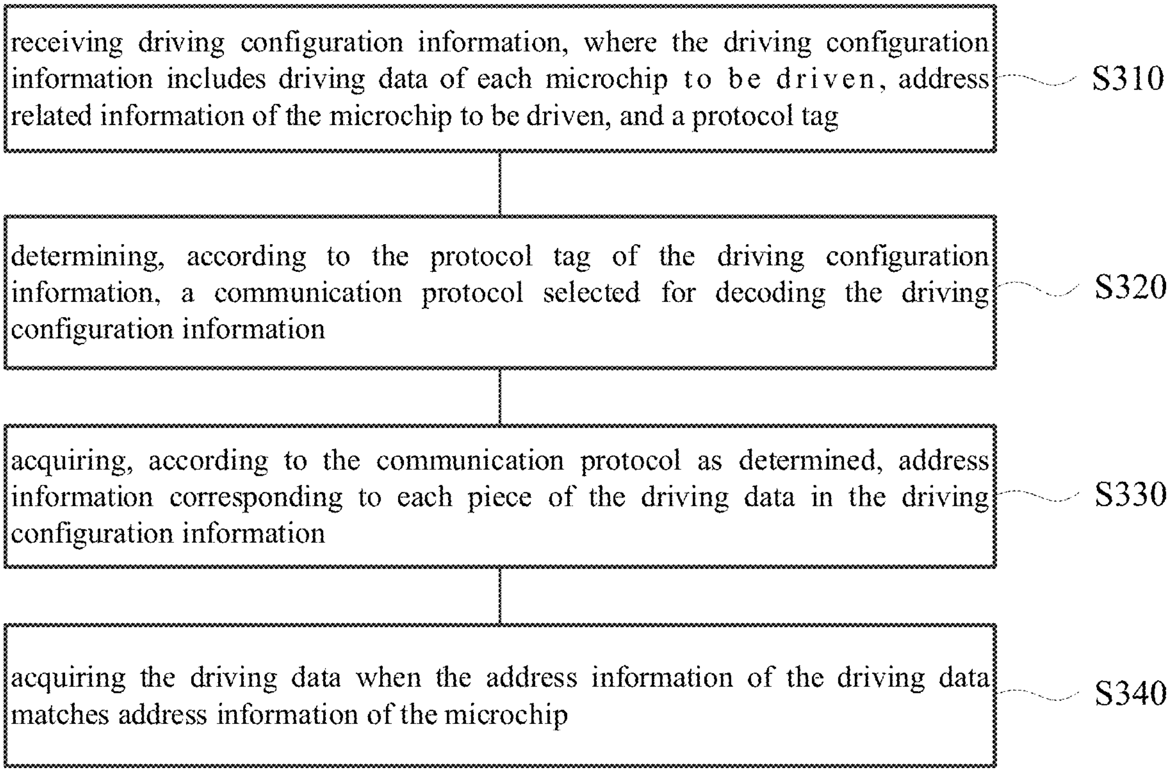
FIG. 12 is a schematic flowchart of a data transmission method applied to a microchip according to an embodiment of the present disclosure.

An embodiment of the present disclosure further provides another data transmission method, which is applied to a microchip MIC to control a light emitting zone LEDA of a backlight module BLU. Referring to FIG. 12, the data transmission method includes the following steps S310 to S340.

In step S310, driving configuration information is received. The driving configuration information includes driving data Data of each selected microchip DMIC, address related information of the selected microchip DMIC, and a protocol tag.

In step S320, a communication protocol selected for decoding the driving configuration information is determined according to the protocol tag of the driving configuration information.

In step S330, address information corresponding to each piece of the driving data Data in the driving configuration information is acquired according to the communication protocol as determined.

In step S340, the driving data Data is acquired when the address information of the driving data Data matches address information of the microchip MIC.

In an example, the driving configuration information does not include driving data Data of another microchip MIC other than the selected microchip DMIC.

In an example, the driving configuration information includes at least one configuration data group; and any configuration data group includes starting address information SID and at least one piece of the driving data Data that are arranged sequentially; where the starting address information SID is address information corresponding to a first piece of the driving data Data, and the address information corresponding to the first piece of the driving data Data is capable of being used for determining address information corresponding to other driving data Data.

In an example, the driving configuration information includes first driving configuration information, the first driving configuration information includes a first protocol tag SOP1 and the at least one configuration data group that are arranged sequentially, and the configuration data group of the first driving configuration information includes the starting address information SID, an address stride and a plurality of pieces of the driving data Data that are arranged sequentially.

In a same configuration data group, the address stride is a difference between address information corresponding to a subsequent piece of the driving data Data and address information corresponding to a previous piece of the driving data Data.

In an example, the driving configuration information includes second driving configuration information, and the second driving configuration information includes a second protocol tag SOP2, an address stride and the at least one configuration data group.

The address stride is a difference between address information corresponding to a subsequent piece of the driving data Data and address information corresponding to a previous piece of the driving data Data that are in a same configuration data group.

The details and effects of each step of the data transmission method in the embodiment of the present disclosure are introduced in detail in the above-mentioned embodiment of the driving method for the liquid crystal display apparatus, and will not be repeated herein.

An embodiment of the present disclosure further provides a backlight driver BCON that is configured to drive a backlight module BLU. Referring to FIG. 13, the backlight driver BCON includes:

an independent transceiver DMA, configured to receive a dimming data group, where the dimming data group includes dimming data corresponding to a light emitting zone LEDA controlled by one row of microchips MIC or by multiple adjacent rows of the microchips MIC;

a microprocessor MCU, configured to determine driving configuration information of each of the signal channels CH according to the dimming data group; where the driving configuration information of any one of the signal channels CH includes driving data Data of a selected microchip DMIC and address related information of the selected microchip DMIC in the signal channel CH, and the selected microchip DMIC is the microchip MIC that controls the light emitting zone LEDA corresponding to the dimming data in the dimming data group; and a programmable logic controller PLC, configured to send corresponding driving configuration information to each of the signal channels CH.

In an example, the driving configuration information does not include driving data Data of another microchip MIC other than the selected microchip DMIC.

In an example, the driving configuration information includes at least one configuration data group; any configuration data group includes starting address information SID and at least one piece of the driving data Data that are arranged sequentially; where the starting address information SID is address information corresponding to a first piece of the driving data Data, and the address information corresponding to the first piece of the driving data Data is capable of being used for determining address information corresponding to other driving data Data.

In an example, the driving configuration information further includes a starting tag, a protocol tag and an ending tag arranged sequentially; where each configuration data group is located between the protocol tag and the ending tag, and the protocol tag is used for marking a communication protocol used by the driving configuration information.

In an example, the driving configuration information includes first driving configuration information, the first driving configuration information includes a first protocol tag SOP1 and the at least one configuration data group that are arranged sequentially, and the configuration data group of the first driving configuration information includes the starting address information SID, an address stride and a plurality of pieces of the driving data Data that are arranged sequentially.

In a same configuration data group, the address stride is a difference between address information corresponding to a subsequent piece of the driving data Data and address information corresponding to a previous piece of the driving data Data.

In an example, the driving configuration information includes second driving configuration information, and the second driving configuration information includes a second protocol tag SOP2, an address stride and the at least one configuration data group.

The address stride is a difference between address information corresponding to a subsequent piece of the driving data Data and address information corresponding to a previous piece of the driving data Data that are in a same configuration data group.

In an example, the microprocessor MCU is configured to: determine, according to a position of the light emitting zone LEDA corresponding to each piece of the dimming data in the dimming data group as received, address information of the microchip MIC that controls the light emitting zone LEDA in any one of the signal channels CH; determine, according to the address information, the communication protocol used for generating the driving configuration information of each of the signal channels CH; and generate and send, according to the communication protocol as determined, the driving configuration information of each of the signal channels CH.

The details and effects of the backlight driver BCON in the embodiment of the present disclosure are described in detail in the above-mentioned embodiment of the driving method for the liquid crystal display apparatus, and will not be repeated here.

Figure 14:
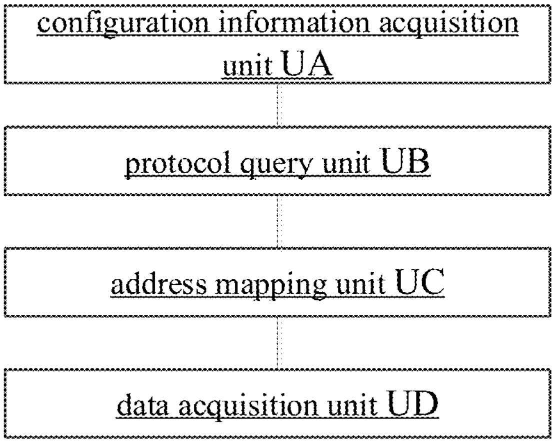
FIG. 14 is a schematic diagram of the principle of a microchip according to an embodiment of the present disclosure.

An embodiment of the present disclosure further provides a microchip MIC that is configured to control a light emitting zone LEDA of a backlight module BLU. Referring to FIG. 14, the microchip MIC includes:

a configuration information acquisition unit UA, configured to receive driving configuration information, where the driving configuration information includes driving data Data of each selected microchip DMIC, address related information of the selected microchip DMIC, and a protocol tag;

a protocol query unit UB, configured to determine, according to the protocol tag of the driving configuration information, a communication protocol selected for decoding the driving configuration information;

an address mapping unit UC, configured to acquire, according to the communication protocol as determined, address information corresponding to each piece of the driving data Data in the driving configuration information; and a data acquisition unit UD, configured to acquire the driving data Data when the address information of the driving data Data matches address information of the microchip MIC.

When the microchip MIC is capable of acquiring the data Data from the driving configuration information, the microchip MIC serves as the selected microchip DMIC in the embodiment of the present disclosure.

In an example, the driving configuration information does not include driving data Data of another microchip MIC other than the selected microchip DMIC.

In an example, the driving configuration information includes at least one configuration data group; and any configuration data group includes starting address information SID and at least one piece of the driving data Data that are arranged sequentially; where the starting address information SID is address information corresponding to a first piece of the driving data Data, and the address information corresponding to the first piece of the driving data Data is capable of being used for determining address information corresponding to other driving data Data.

In an example, the driving configuration information includes first driving configuration information, the first driving configuration information includes a first protocol tag SOP1 and the at least one configuration data group that are arranged sequentially, and the configuration data group of the first driving configuration information includes the starting address information SID, an address stride and a plurality of pieces of the driving data Data that are arranged sequentially.

In a same configuration data group, the address stride is a difference between address information corresponding to a subsequent piece of the driving data Data and address information corresponding to a previous piece of the driving data Data.

In an example, the driving configuration information includes second driving configuration information, and the second driving configuration information includes a second protocol tag SOP2, an address stride and the at least one configuration data group.

The address stride is a difference between address information corresponding to a subsequent piece of the driving data Data and address information corresponding to a previous piece of the driving data Data that are in a same configuration data group.

The details and effects of the microchip MIC in the embodiment of the present disclosure are described in detail in the above-mentioned embodiment of the driving method for the liquid crystal display apparatus, and will not be repeated here. It may be understood that the microchip MIC also includes other functional units and circuits for driving the light emitting zone LEDA.

It should be noted that although the steps of the data transmission method in the present disclosure are described in a particular order in the accompanying drawings, it is not required or implied that the steps must be performed in that particular order or that all of the steps shown must be performed in order to achieve the desired results. Additionally or alternatively, certain steps may be omitted, multiple steps may be combined into one step for execution, and/or one step may be decomposed into multiple steps for execution, etc.

After considering the specification and practicing the disclosure disclosed herein, those skilled in the art will easily come up with other embodiments of the present disclosure. The purpose of the present disclosure is to cover any variations, uses, or adaptive changes of the present disclosure, which follow the general principles of the present disclosure and include common knowledge or commonly used technical means in the technical field that are not disclosed in the present disclosure. The specification and embodiments are only considered exemplary, and the true scope and spirit of the present disclosure are indicated by the appending claims.

What is claimed is:

1. A driving method for a liquid crystal display apparatus, wherein the liquid crystal display apparatus comprises a backlight module, the backlight module comprises a plurality of signal channels, and each of the signal channels comprises a plurality of microchips and light emitting zones controlled by the microchips; wherein the driving method for the liquid crystal display apparatus comprises:

generating and sending, by a system unit according to image data, respective ones of dimming data groups sequentially, wherein each of the dimming data groups comprises dimming data corresponding to a light emitting zone controlled by one row of microchips or by multiple adjacent rows of the microchips;

responding, by a backlight driver, to respective ones of the dimming data groups sequentially; wherein responding, by the backlight driver, to any one of the dimming data groups comprises: receiving the dimming data group, and sending driving configuration information to each of the signal channels according to the dimming data group; wherein the driving configuration information of any one of the signal channels comprises driving data of a selected microchip and address related information of the selected microchip in the signal channel, and the selected microchip is the microchip that controls the light emitting zone corresponding to the dimming data in the dimming data group; and acquiring, by the selected microchip, the driving data according to the driving configuration information.

2. The driving method for the liquid crystal display apparatus according to claim 1, wherein the driving configuration information does not comprise driving data of another microchip other than the selected microchip.

3. The driving method for the liquid crystal display apparatus according to claim 1, wherein the driving configuration information comprises a protocol tag and at least one configuration data group; and any of the at least one configuration data group comprises starting address information and at least one piece of the driving data that are arranged sequentially; wherein the starting address information is address information corresponding to a first piece of the driving data, the address information corresponding to the first piece of the driving data is capable of being used for determining address information corresponding to other driving data, and the protocol tag is used for marking a communication protocol used by the driving configuration information.

4. The driving method for the liquid crystal display apparatus according to claim 3, wherein the driving configuration information further comprises a starting tag and an ending tag; and the starting tag, the protocol tag, the at least one configuration data group, and the ending tag are arranged sequentially.

5. The driving method for the liquid crystal display apparatus according to claim 3, wherein the driving configuration information comprises first driving configuration information, the first driving configuration information comprises a first protocol tag and the at least one configuration data group that are arranged sequentially, and the configuration data group of the first driving configuration information comprises the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

6. The driving method for the liquid crystal display apparatus according to claim 5, wherein the dimming data group comprises the dimming data corresponding to the light emitting zone controlled by the one row of the microchips; and the sending the driving configuration information to each of the signal channels according to the dimming data group comprises:

sending the first driving configuration information to each of the signal channels according to the dimming data group.

7. The driving method for the liquid crystal display apparatus according to claim 3, wherein the driving configuration information comprises second driving configuration information, and the second driving configuration information comprises a second protocol tag, an address stride and the at least one configuration data group; wherein the address stride is a difference between address information corresponding to a subsequent piece of the driving data and address information corresponding to a previous piece of the driving data that are in a same configuration data group.

8. The driving method for the liquid crystal display apparatus according to claim 6, wherein the dimming data group comprises the dimming data corresponding to the light emitting zone controlled by the plurality of rows of the microchips; and the sending the driving configuration information to each of the signal channels according to the dimming data group comprises:

sending the second driving configuration information to each of the signal channels according to the dimming data group.

9. The driving method for the liquid crystal display device according to claim 3, wherein the sending the driving configuration information to each of the signal channels according to the dimming data group comprises:

determining, according to a position of the light emitting zone corresponding to each piece of the dimming data in the dimming data group as received, address information of the microchip that controls the light emitting zone in any one of the signal channels;

determining, according to the address information as determined, the communication protocol used for generating the driving configuration information of each of the signal channels; and generating and sending, according to the communication protocol as determined, the driving configuration information of each of the signal channels.

10. The driving method for the liquid crystal display apparatus according to claim 3, wherein the acquiring, by the selected microchip, the driving data according to the driving configuration information comprises:

receiving, by a microchip, the driving configuration information;

determining, according to the protocol tag of the driving configuration information, a communication protocol selected for decoding the driving configuration information;

acquiring, according to the communication protocol as determined, address information corresponding to each piece of the driving data in the driving configuration information; and acquiring, by the microchip in response to the address information corresponding to the driving data matching address information of the microchip, the driving data, thereby the microchip serving as the selected microchip.

11. A liquid crystal display apparatus, comprising:

a backlight module, wherein the backlight module comprises a plurality of signal channels, and each of the signal channels comprises a plurality of microchips and light emitting zones controlled by the microchips;

a memory, storing an executable instruction; and a processor, wherein the processor, through executing the executable instruction, is configured to perform the driving method for the liquid crystal display apparatus according to claim 1.

12. A data transmission method, applied to a backlight driver to drive a backlight module; wherein the backlight module comprises a plurality of signal channels, and each of the signal channels comprises a plurality of microchips and light emitting zones controlled by the microchips; wherein the data transmission method comprises:

receiving a dimming data group, wherein the dimming data group comprises dimming data corresponding to a light emitting zone controlled by one row of microchips or by multiple adjacent rows of the microchips;

determining driving configuration information of each of the signal channels according to the dimming data group; wherein the driving configuration information of any one of the signal channels comprises driving data of a selected microchip and address related information of the selected microchip in the signal channel, and the selected microchip is the microchip that controls the light emitting zone corresponding to the dimming data in the dimming data group; and sending corresponding driving configuration information to each of the signal channels.

13. The data transmission method according to claim 12, wherein the driving configuration information does not comprise driving data of another microchip other than the selected microchip.

14. The data transmission method according to claim 12, wherein the driving configuration information comprises at least one configuration data group; any of the at least one configuration data group comprises starting address information and at least one piece of the driving data that are arranged sequentially; wherein the starting address information is address information corresponding to a first piece of the driving data, and the address information corresponding to the first piece of the driving data is capable of being used for determining address information corresponding to other driving data.

15. The data transmission method according to claim 14, wherein the driving configuration information further comprises a starting tag, a protocol tag and an ending tag arranged sequentially; the at least one configuration data group is located between the protocol tag and the ending tag; and the protocol tag is used for marking a communication protocol used by the driving configuration information.

16. The data transmission method according to claim 14, wherein the driving configuration information comprises first driving configuration information, the first driving configuration information comprises a first protocol tag and the at least one configuration data group that are arranged sequentially, and the configuration data group of the first driving configuration information comprises the starting address information, an address stride and a plurality of pieces of the driving data that are arranged sequentially; and in a same configuration data group, the address stride is a difference between address information corresponding to a subsequent piece of the driving data and address information corresponding to a previous piece of the driving data.

17. The data transmission method according to claim 14, wherein the sending the driving configuration information to each of the signal channels according to the dimming data group comprises:

determining, according to a position of the light emitting zone corresponding to each piece of the dimming data in the dimming data group as received, address information of the microchip that controls the light emitting zone in any one of the signal channels;

determining, according to the address information as determined, the communication protocol used for generating the driving configuration information of each of the signal channels; and generating and sending, according to the communication protocol as determined, the driving configuration information of each of the signal channels.

18. A data transmission method, applied to a microchip to control a light emitting zone of a backlight module; wherein the data transmission method comprises:

receiving driving configuration information, wherein the driving configuration information comprises driving data of each selected microchip, address related information of the selected microchip, and a protocol tag;

determining, according to the protocol tag of the driving configuration information, a communication protocol selected for decoding the driving configuration information;

acquiring, according to the communication protocol as determined, address information corresponding to each piece of the driving data in the driving configuration information; and acquiring the driving data in response to the address information of the driving data matching address information of the microchip.

19. The data transmission method according to claim 18, wherein the driving configuration information does not comprise driving data of another microchip other than the selected microchip.

20. The data transmission method according to claim 18, wherein the driving configuration information comprises at least one configuration data group; and any of the at least one configuration data group comprises starting address information and at least one piece of the driving data that are arranged sequentially; wherein the starting address information is address information corresponding to a first piece of the driving data, and the address information corresponding to the first piece of the driving data is capable of being used for determining address information corresponding to other driving data.

* * * * *